(12) United States Patent
Yamauchi

(10) Patent No.: US 8,762,558 B2
(45) Date of Patent: Jun. 24, 2014

(54) COMMUNICATION SYSTEM, SERVER, COMMUNICATION METHOD, AND STORAGE MEDIUM

(75) Inventor: Mitsugu Yamauchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 13/125,169

(22) PCT Filed: Jan. 27, 2010

(86) PCT No.: PCT/JP2010/051453
§ 371 (c)(1),
(2), (4) Date: Apr. 20, 2011

(87) PCT Pub. No.: WO2010/087499
PCT Pub. Date: Aug. 5, 2010

(65) Prior Publication Data
US 2011/0196948 A1    Aug. 11, 2011

(30) Foreign Application Priority Data
Jan. 29, 2009   (JP) .................................. 2009-018191

(51) Int. Cl.
*G06F 15/16* (2006.01)
*H04N 1/00* (2006.01)
*H04M 3/54* (2006.01)

(52) U.S. Cl.
CPC ............ *H04M 3/54* (2013.01); *H04N 1/00244* (2013.01); *H04N 1/00312* (2013.01); *H04N 1/00281* (2013.01); *H04N 1/00347* (2013.01); *H04N 2201/0015* (2013.01); *H04N 2201/0039* (2013.01); *H04N 2201/0094* (2013.01)
USPC ........... 709/230; 358/400; 358/401; 358/402; 358/403

(58) Field of Classification Search
CPC . H04M 3/54; H04N 1/00244; H04N 1/00312; H04N 1/00281; H04N 1/00347; H04N 2201/0015; H04N 2201/0094; H04N 2201/0039

USPC .................................. 709/230; 358/400–403
See application file for complete search history.

(56) References Cited

U.S. PATENT DOCUMENTS

| | | | |
|---|---|---|---|
| 2007/0073880 A1* | 3/2007 | Krishnakumar et al. | 709/225 |
| 2007/0258111 A1* | 11/2007 | Ooizumi | 358/402 |
| 2007/0268526 A1* | 11/2007 | Ito et al. | 358/403 |
| 2007/0279698 A1* | 12/2007 | Ichiki | 358/400 |
| 2007/0280122 A1* | 12/2007 | Ito | 370/250 |

FOREIGN PATENT DOCUMENTS

| | | |
|---|---|---|
| JP | 2003-016011 A | 1/2003 |
| JP | 2005-094662 A | 4/2005 |
| JP | 2007-312337 A | 11/2007 |

\* cited by examiner

*Primary Examiner* — Patrice Winder
(74) *Attorney, Agent, or Firm* — Fitzpatrick, Cella, Harper & Scinto

(57) ABSTRACT

A communication system capable of preventing data transmission to a terminal not desired by the user, and setting a redirect destination of data from a terminal desired by the user. A SIP server transmits address information of a first terminal to an external apparatus when the SIP server receives a connection request to the first terminal from the external apparatus. The SIP server determines whether or not to permit a second terminal to be set as a redirect destination of the connection request when it is requested by the user to set the second terminal as the redirect destination, and sets the second terminal as the redirect destination according to the determination. Then, the SIP server transmits address information of the second terminal to the external apparatus when it receives the connection request in a state where the second terminal is set as the redirect destination.

16 Claims, 15 Drawing Sheets

FIG.4

| | RECEIVING-SIDE TERMINAL INFORMATION | | | | REDIRECT DESTINATION TERMINAL INFORMATION | | | |
|---|---|---|---|---|---|---|---|---|
| TERMINAL NAME | UNIQUE TERMINAL ID | FAX NUMBER | IP ADDRESS | | TERMINAL NAME | FAX NUMBER | IP ADDRESS | REDIRECT SETTING |
| MFP-A | abc123 | 03-1111-1111 | 11.11.11.11 | | MFP-B | 03-1111-2222 | 11.11.11.22 | NOT SET |
| | | | | | MFP-C | 03-1111-3333 | 11.11.11.33 | SET |
| 401 | 402 | 403 | 404 | | 411 | 412 | 413 | 414 |

400 / 410

COMMUNICATION SYSTEM, SERVER, COMMUNICATION METHOD, AND STORAGE MEDIUM

TECHNICAL FIELD

The present invention relates to a communication system in which a plurality of terminals including at least a first terminal and a second terminal, and a server are connected to each other via a communication line, for performing data communication using a predetermined communication control protocol, the server, a communication method, and a storage medium storing a program for executing the communication method.

BACKGROUND ART

In recent years, there has been known a communication system using a communication control protocol, such as SIP (Session Initiation Protocol). In the communication system using SIP, a plurality of terminals, such as IP telephone sets and FAX terminals, are connected to a SIP server, which performs SIP call control between an external apparatus and the terminals. The SIP server is comprised of a redirect server, a proxy server, a registration server and a location server.

For example, in a communication system in which FAX terminals are connected to the SIP server, specific FAX numbers and address information items (e.g. IP addresses) of the respective FAX terminal are registered in advance in association with each other in the SIP server (location server). When the SIP server receives a connection request to a specific FAX number from the external apparatus, in response to the request, the SIP server notifies the external apparatus of an IP address associated with the specific FAX number. The external apparatus having received the notification makes a connection request to the notified IP address, whereby a call is established between the external apparatus and the FAX terminal.

By the way, in the above-mentioned SIP server, it is possible to set a FAX machine (hereinafter referred to as "the second terminal") different from the FAX terminal (hereinafter referred to as "the first terminal") having an IP address associated with the specific FAX number, as a redirect destination (Patent Literature 1).

If the above setting is made, when the SIP server receives the connection request to the specific FAX number, the SIP server transmits an IP address of the second terminal in place of the IP address of the first terminal, although originally, the IP address of the first terminal is to be transmitted. This causes the external apparatus to make a connection request to the second terminal, and hence, as a consequence, the connection request to the first terminal is transferred or redirected to the second terminal.

CITATION LIST

Patent Literature

{PTL 1} Japanese Patent Laid-Open Publication No. 2005-94662

SUMMARY OF INVENTION

Technical Problem

Now, when performing the setting for redirecting the connection request to the first terminal to the second terminal, as described above, if the setting can be made from any of the registered terminals, there arises a security problem.

Specifically, when a FAX terminal owned by a malicious third party is set as a redirect destination of a connection request to a FAX number (e.g. of 03-1111-1111), transmission data to be transmitted to the FAX number 03-1111-1111 is transmitted to the FAX terminal of the third party.

To prevent such setting of a redirect destination, which is not desired by the user, it is only required that the redirect destination can be set only from a FAX terminal (first terminal) which originally should receive the transmission data, to thereby inhibit setting of redirection from another terminal.

In this case, however, the user cannot set redirection from a FAX terminal outside the house or office of the user, which is inconvenient to the user.

The present invention provides a communication system which is capable of preventing data transmission to a terminal which is not desired by the user, and setting a redirect destination of data from a terminal which is desired by the user, a sever, a communication method, and a storage medium storing a program for executing the communication method.

Solution to Problem

Accordingly, in a first aspect of the present invention, there is provided a communication system in which a plurality of terminals including at least a first terminal and a second terminal and a server are connected to each other via a communication line, for performing data communication using a predetermined communication control protocol, wherein the server comprises a response unit configured to transmit address information of the first terminal to an external apparatus when the server receives a connection request to the first terminal from the external apparatus, a determination unit configured to determine whether or not to permit the second terminal to be set as a redirect destination of the connection request to the first terminal when the server received from the second terminal a request for setting the second terminal as the redirect destination, a setting unit configured to set the second terminal as the redirect destination of the connection request to the first terminal when it is determined by the determination unit that the second terminal is permitted to be set as the redirect destination of the connection request to the first terminal, and a control unit configured to control the response unit such that the response unit transmits a response of address information of the second terminal when the server receives the connection request to the first terminal in a state where the second terminal is set as the redirect destination of the connection request to the first terminal by the setting unit.

Accordingly, in a second aspect of the present invention, there is provided a server which is connected to a plurality of terminals including at least a first terminal and a second terminal via a communication line, for performing data communication using a predetermined communication control protocol, comprising a response unit configured to transmit address information of the first terminal to an external apparatus when the server receives a connection request to the first terminal from the external apparatus, a determination unit configured to determine whether or not to permit the second terminal to be set as a redirect destination of the connection request to the first terminal when the server received from the second terminal a request for setting the second terminal as the redirect destination, a setting unit configured to set the second terminal as the redirect destination of the connection request to the first terminal when it is determined by the determination unit that the second terminal is permitted to be set as the redirect destination of the connection request to the first terminal, and a control unit configured to control the response unit such that the response unit transmits a response of address information of the second terminal when the server receives the connection request to the first terminal in a state where the second terminal is set as the redirect destination of the connection request to the first terminal by the setting unit.

Accordingly, in a third aspect of the present invention, there is provided a communication method for a communication system in which a plurality of terminals including at least a first terminal and a second terminal and a server are connected to each other via a communication line, for performing data communication using a predetermined communication control protocol, wherein the server transmits from the server a response of address information of the first terminal to an external apparatus when the server receives a connection request to the first terminal from the external apparatus, determines whether or not to permit the second terminal to be set as a redirect destination of the connection request to the first terminal when the second terminal requests the server to set the second terminal as the redirect destination of the connection request to the first terminal, sets the second terminal as the redirect destination of the connection request to the first terminal when it is determined that the second terminal is permitted to be set as the redirect destination of the connection request to the first terminal, and performs control such that a response of address information of the second terminal is transmitted when the server receives the connection request to the first terminal in a state where the second terminal is set as the redirect destination of the connection request to the first terminal by the setting.

Accordingly, in a fourth aspect of the present invention, there is provided a computer-readable storage medium storing a program for causing a computer to execute the communication method.

Advantageous Effects of Invention

According to the present invention, it is possible to provide a communication system which is capable of preventing data transmission to a terminal which is not desired by the user, and setting a redirect destination of data from a terminal which is desired by the user.

Further features of the present invention will become apparent from the following description of exemplary embodiments (with reference to the attached drawings).

BRIEF DESCRIPTION OF DRAWINGS

FIG. 4 is a view showing an example of redirect destination information.

DESCRIPTION OF EMBODIMENTS

The present invention will now be described in detail below with reference to the drawings showing an embodiment thereof.

Figure 1:
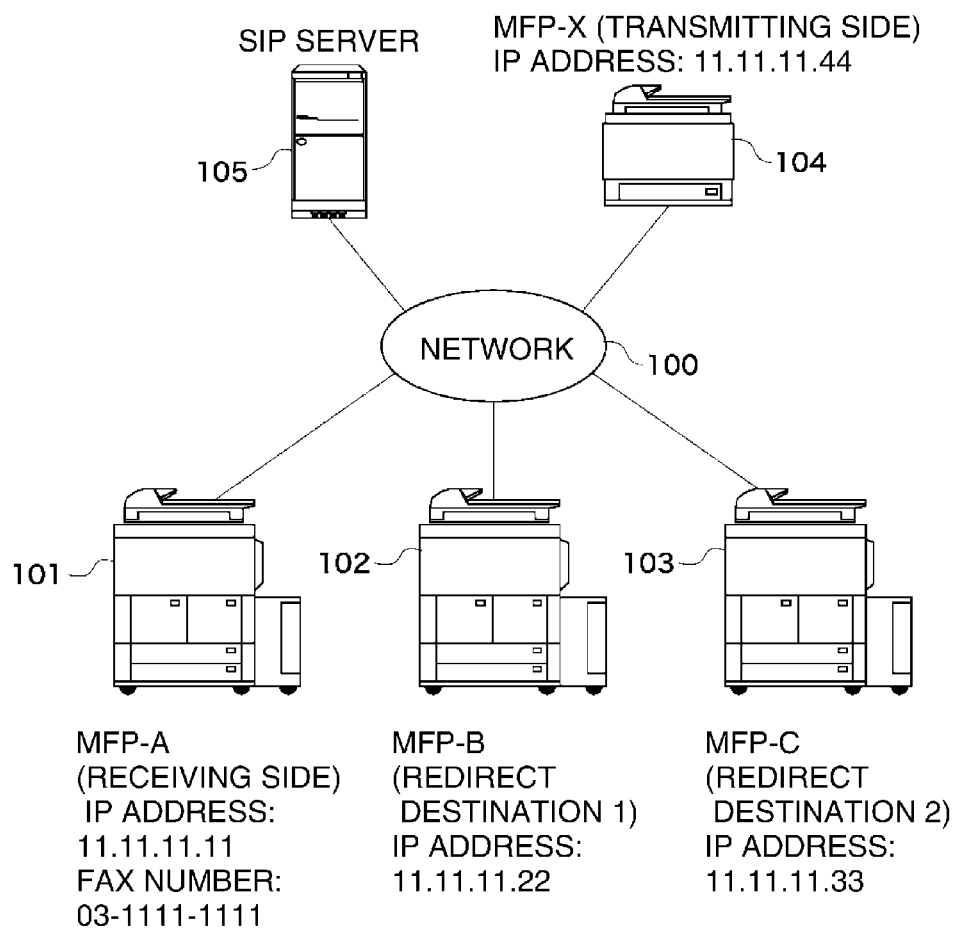
FIG. 1 is a diagram showing an example of the configuration of a communication system according to a first embodiment of the present invention.

FIG. 1 is a diagram showing an example of the configuration of a communication system according to a first embodiment of the present invention. Referring to FIG. 1, in the communication system according to the present embodiment, the respective terminals of an MFP-A 101, an MFP-B 102, an MFP-C 103 and an MFP-X 104 and a SIP (Session Initiation Protocol) server 105 are communicably connected to each other via a network (communication line) 100. The terminals of the MFP-A 101, the MFP-B 102, the MFP-C 103 and the MFP-X 104 and the SIP server 105 each perform data communication using a predetermined communication control protocol (SIP).

The MFP-A 101, the MFP-B 102, the MFP-C 103 and the MFP-X 104 are multi-function printers each equipped with a copy function, a facsimile function and a printing function. In the present embodiment, the MFP-A 101 is assumed to have a FAX number of "03-1111-1111".

The SIP server 105 is comprised of a redirect server, a proxy server, a registration server and a location server, none of which are shown. Further, the SIP server 105 performs the management of registration of each terminal, user authentication, the conversion of a telephone or FAX number to address information, such as IP address information, the control of a call control sequence, routing to a connection destination, and so forth.

Figure 2:
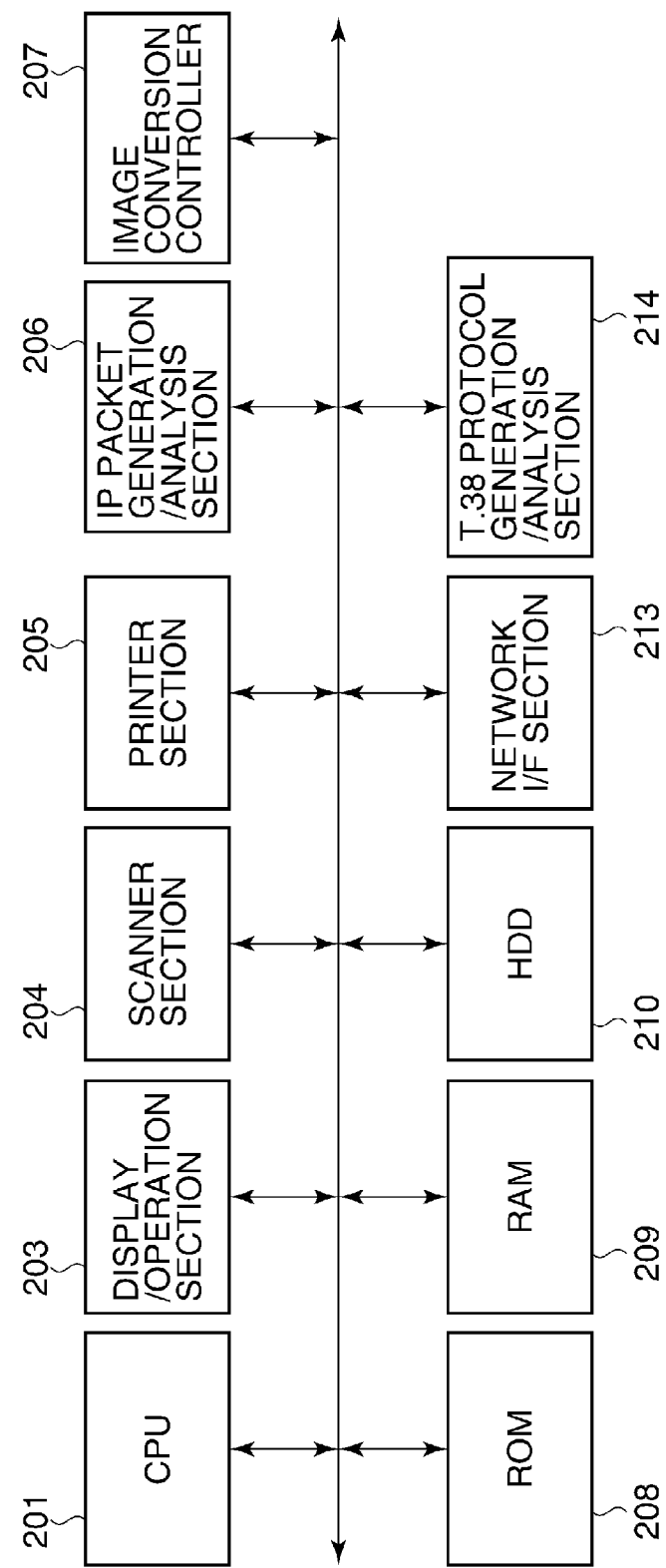
FIG. 2 is a block diagram useful in explaining an example of the configuration of an MFP.

FIG. 2 is a block diagram useful in explaining an example of the configuration of the MFP-A 101. The configurations of the MFP-B 102, the MFP-C 103 and the MFP-X 104 are the same as that of the MFP-A 101, and hence description thereof is omitted.

Referring to FIG. 2, a CPU 201 controls each device constituting the MFP-A 101 based on a control program stored in a ROM 208. A display/operation section 203 displays e.g. windows, icons, messages, menus, and other user interface information, on a display screen thereof. The display/operation section 203 is comprised of various kinds of keys, not shown, via which the user performs an operation for copying, facsimile transmission and printing, and a screen pointing device, not shown, by which the user operates an icon, a menu, etc. displayed on the display screen.

A scanner section 204 reads an image from an original. A printer section 205 prints print data stored in a RAM 209 and a HDD 210. The ROM 208 stores various kinds of control programs and data. The RAM 209 has a work area for the CPU 201, a data save area for use in error processing, a load area for control programs, and the like. The HDD 210 stores various kinds of control programs and print data.

A network interface (I/F) section 213 is connected to the network 100, and performs communication with the SIP server 105, the MFP-B 102, the MFP-C 103 and the MFP-X 104. The network interface section 213 also performs communication for SIP-FAX. A T.38 protocol generation/analysis section 214 has the function of generating facsimile transmission information that is to be transmitted according to a protocol defined by ITU-T Recommendation T.38, and further analyzing received facsimile transmission information.

An IP packet generation/analysis section 206 has the function of mapping the protocol defined in ITU-U Recommendation T.38 to IP packets, and further extracting the protocol defined in the ITU-UT Recommendation T.38 from received IP packets. An image conversion controller 207 performs the compression, expansion, zooming and linear density conversion of images to be transmitted and received by facsimile communication.

Figure 3:
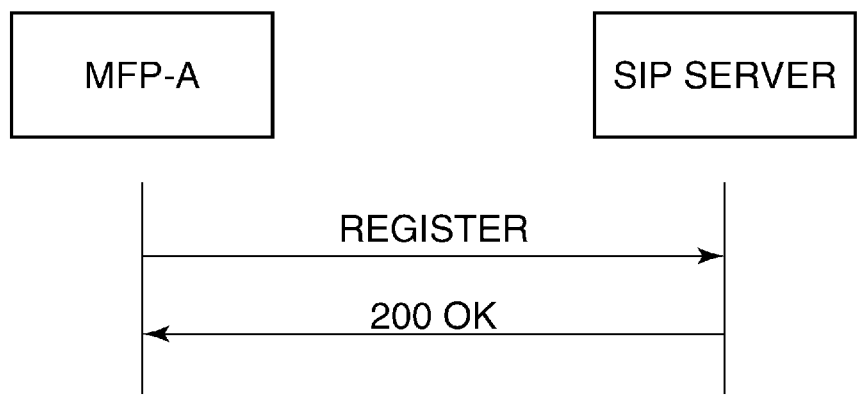
FIG. 3 is a diagram useful in explaining a process in which the MFP-A registers information in a SIP server.

FIG. 3 is a diagram useful in explaining a process in which the MFP-A 101 registers information in the SIP server 105. Contents of the information registered in the SIP server 105 will be described hereinafter.

The MFP-A 101 transmits a REGISTER request to the SIP server 105, and requests the SIP server 105 to register information. When registration of the information in the SIP server 105 is successful, a 200 OK response is sent from the SIP server 105 to the MFP-A 101. Information registered in the SIP server 105 is information on redirect destination (forwarding destination) terminals associated with a predetermined receiving-side terminal (hereinafter referred to as "the redirect destination information").

FIG. 4 shows an example of the redirect destination information. The redirect destination information is stored in a memory, not shown, of the SIP server 105. As shown in FIG. 4, in the redirect destination information, a terminal name 401, a unique terminal ID 402, a FAX number 403 and an IP address 404 are defined as receiving-side terminal information 400.

In the receiving-side terminal information 400, there are registered information items, such as "MFP-A" as the terminal name 401, "abc123" as the unique terminal ID 402, "03-1111-1111" as the FAX number 403, and "11.11.11.11" as the IP address 404. The unique terminal ID 402 is an ID which is assigned to each individual terminal such that the individual terminal can be identified. Although there are various kinds of terminals, there are no plurality of terminals having the same unique terminal ID. Therefore, when the unique terminal ID 402 is "abc123", "MFP-A" is identified as the terminal name 401.

Further, as shown in FIG. 4, in the redirect destination information, there are defined information items, such as a terminal name 411, a FAX number 412, an IP address 413 and a redirect setting 414, as redirect destination terminal information 410. In the redirect destination terminal information 410, there are registered information items, such as "MFP-B" as the terminal name 411, "03-1111-2222" as the FAX number 412, "11.11.11.22" as the IP address 413, and "not set" as the redirect setting 414. Similarly, in the redirect destination terminal information 410, there are also registered information items, such as "MFP-C" as the terminal name 411, "03-1111-3333" as the FAX number 412, "11.11.11.33" as the IP address 413, and "set" as the redirect setting 414.

In the case of FIG. 4, "MFP-B" and "MFP-C" (second terminals) registered in the column of the terminal name 411 are set as candidates for the redirect destination terminal for "MFP-A" (first terminal) registered in the column of the terminal name 401 of the receiving-side terminal information 400. This means that in this case, "MFP-B" and "MFP-C" are designated as terminals each of which can be set as a redirect destination for a connection request to "MFP-A". Further, the information of "set" registered in the column of the redirect setting 414 in association with "MFP-C" in the column of the terminal name 411 indicates that out of the two candidates "MFP-B" and "MFP-C" for the redirect destination, "MFP-C" is set as the redirect destination terminal. In short, in this case, the redirect destination information is configured such that the connection request to the first terminal ("MFP-A") is redirected to "MFP-C".

Although in the present embodiment, the candidates for the redirect destination are described using the two candidates "MFP-B" and "MFP-C" for convenience of description, a larger number of candidates for the redirect destination may be registered.

Figure 5:
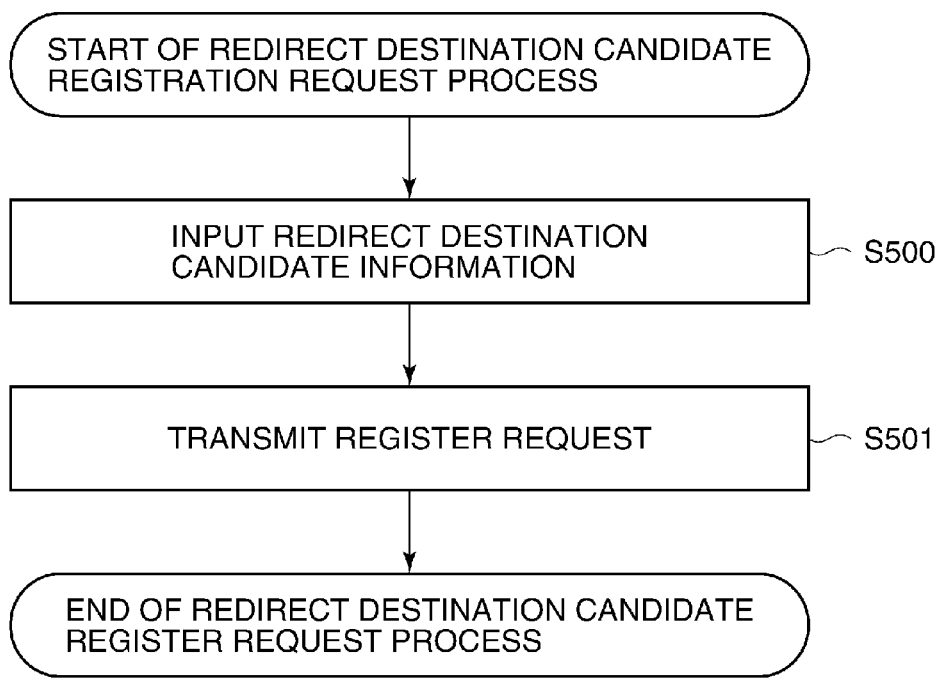
FIG. 5 is a flowchart of a redirect destination candidate registration request process which is executed by an MFP when a user of the MFP requests the SIP server to register a candidate for a redirect destination in the redirect destination information.

FIG. 5 is a flowchart of a redirect destination candidate registration request process which is carried out by an MFP (MFP-A 101 in the present example) when the user of the MFP requests the SIP server 105 to register a candidate for a redirect destination in the redirect destination information. The steps in FIG. 5 are carried out by the CPU 201 of the MFP-A 101, which loads a program for the redirect destination candidate registration request process stored in the ROM 208, the HDD 210 or the like of the MFP-A 101, into the RAM 209 of the same, and executes the program.

With reference to FIG. 5, a description will be given of a case where the user of the MFP-A 101 registers a candidate for the redirect destination for redirecting FAX transmission to the FAX number "03-1111-1111" of the MFP-A 101.

Referring to FIG. 5, in a step S500, the user inputs information on a desired candidate for the redirect destination, and then the process proceeds to a step S501. The user inputs the information on the desired candidate for the redirect destination by operating various kinds of keys or the like of the display/operation section 203 (see FIG. 2). Specifically, the information on the desired candidate for the redirect destination is the redirect destination terminal information 410 shown in FIG. 4. The user inputs the terminal name 411, the FAX number 412, the IP address 413 and the redirect setting 414 of a desired redirect destination terminal. It is assumed here that the contents of the input are the same as the contents of the redirect destination terminal information 410 in FIG. 4.

In the step S501, the CPU 201 of the MFP-A 101 transmits a REGISTER request to the SIP server 105, followed by terminating the present process. In the present example, the terminal name "MFP-A", the unique terminal ID "abc123", the FAX number "03-1111-1111" and the IP address "11.11.11.11" are transmitted to the SIP server 105, using the REGISTER request. Further, the terminal name 411, the FAX number 412, the IP address 413 and the redirect setting 414 of the redirect destination terminal, input by the user in the step S500, are also transmitted to the SIP server 105.

Figure 6:
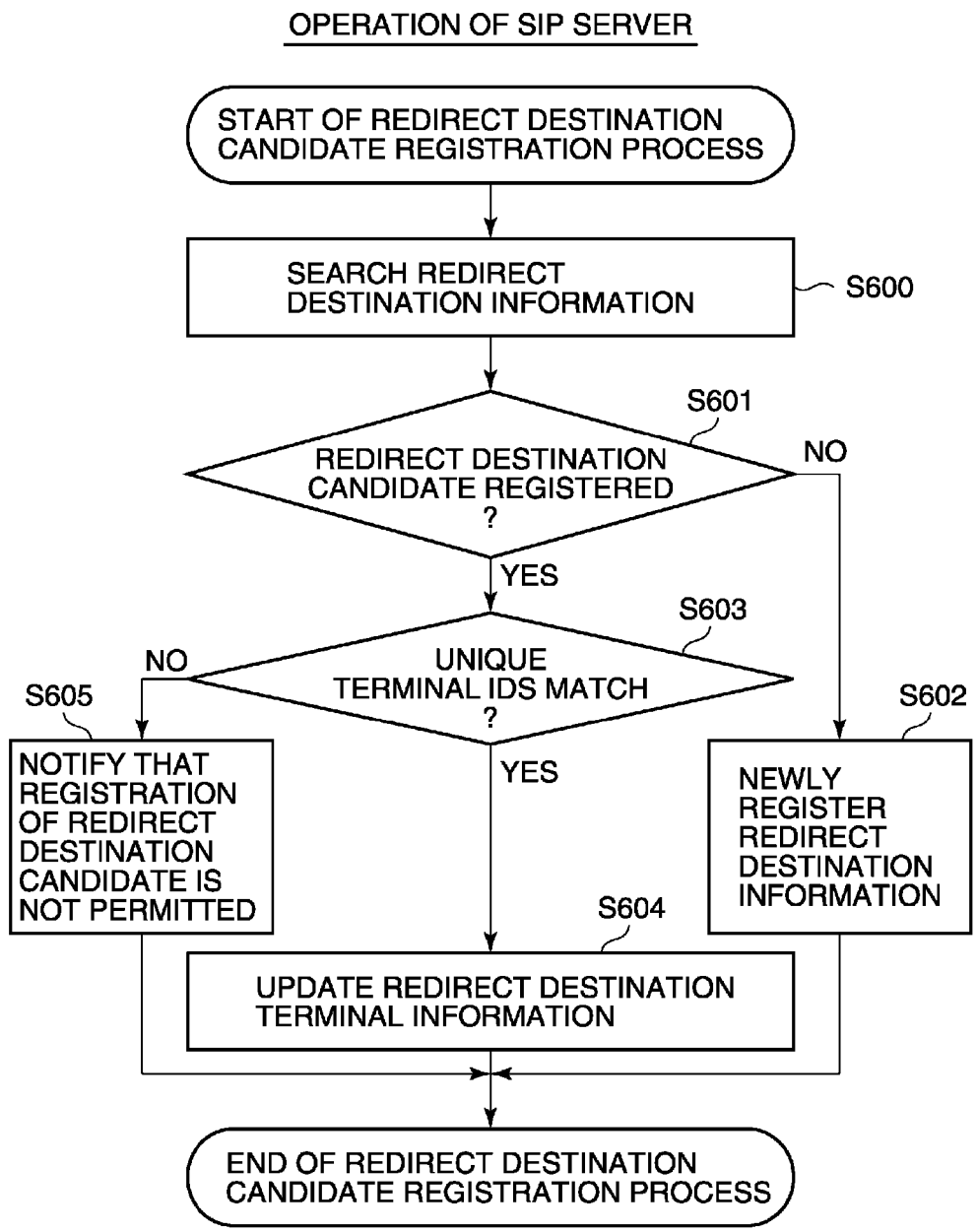
FIG. 6 is a flowchart of a redirect destination candidate registration process which is executed by the SIP server when requested by an MFP to register a candidate for a redirect destination in the redirect destination information.

FIG. 6 is a flowchart of a redirect destination candidate registration process which is executed the SIP server 105 when requested by an MFP (MFP-A 101 in the present example) to register a candidate for a redirect destination in the redirect destination information. The steps in FIG. 6 are carried out by a CPU, not shown, of the SIP server 105 which loads a program for the redirect destination candidate registration process stored in a ROM, a HDD or the like, not shown, of the SIP server 105 into a RAM, not shown, of the same, and executes the program.

When the SIP server receives the REGISTER request for registering the candidate for the redirect destination in the redirect destination information (transmitted in the step S501 in FIG. 5 in the case of the present example), from the MFP-A 101, in a step S600, the CPU of the SIP server 105 searches the redirect destination information shown in FIG. 4, and the process proceeds to a step S601.

In the step S601, the CPU of the SIP server 105 determines whether or not the candidate for the redirect destination for the MFP-A 101 as a registration-requesting terminal, has already been registered in the redirect destination information shown in FIG. 4. If the terminal name of the registration-requesting terminal exists in the column of the terminal name 401 of the receiving-side terminal information 400 in FIG. 4, the CPU of the SIP server 105 determines that the candidate for the redirect destination for the registration-requesting terminal has already been registered, and the process proceeds to a step S603.

On the other hand, if the terminal name of the registration-requesting terminal does not exist in the column of the terminal name 401 of the receiving-side terminal information 400, the CPU of the SIP server 105 determines that the candidate for the redirect destination for the registration-requesting terminal has not been registered yet, and the process proceeds to a step S602. In the step S602, the CPU of the SIP server 105 registers information on a new redirect destination, followed by terminating the registration process.

Specifically, the CPU of the SIP server 105 stores the terminal name ("MFP-A" in the above-described example) and the unique terminal (ID "abc123" in the above-described example) transmitted from the MFP-A 101 in the step S501 in FIG. 5, in the receiving-side terminal information 400 appearing in FIG. 4. Further, the CPU of the SIP server 105 also stores the FAX number ("03-1111-1111" in the above-described example) and the IP address ("11.11.11.11" in the above-described example) transmitted from the MFP-A 101 in the step S501 in FIG. 5, in the receiving-side terminal information 400 appearing in FIG. 4.

Further, the CPU of the SIP server 105 stores the information on the candidate for the redirect destination, transmitted from the MFP-A 101 in the redirect destination terminal information 410 in FIG. 4. It is assumed in the present case that the contents of the information on the candidate for the redirect destination stored in the redirect destination terminal information 410 are the same as the contents shown in FIG. 4.

In the step S603, the CPU of the SIP server 105 determines whether or not the unique terminal ID 402 associated with the terminal name 401 of the receiving-side terminal information 400 stored in the redirect destination information matches a unique terminal ID transmitted from the registration-requesting terminal. The unique terminal ID of the registration-requesting terminal is transmitted from the registration-requesting terminal to the SIP server 105 with the REGISTER request.

Assuming that the terminal name "MFP-A", the unique terminal ID "abc123", the FAX number "03-1111-1111" and the IP address "11.11.11.11" are already stored in the redirect destination information, since the unique terminal ID transmitted from the registration-requesting terminal MFP-A 101 (in the present example) is "abc123", the CPU of the SIP server 105 determines in the step S603 that the unique terminal ID 402 of the terminal name 401 of the receiving-side terminal information 400 stored in the redirect destination information matches the unique terminal ID transmitted from the registration-requesting terminal, and the process proceeds to a step S604.

On the other hand, in a case where a REGISTER request for registering a candidate for a redirect destination of FAX transmission to the FAX number "03-1111-1111" of the MFP-A 101 is transmitted from a registration-requesting terminal other than the MFP-A 101, a unique terminal ID different from "abc123" is transmitted from the registration-requesting terminal to the SIP server 105. In this case, the CPU of the SIP server 105 determines in the step S603 that the unique terminal ID 402 of the terminal name 401 of the receiving-side terminal information 400 stored in the redirect destination information does not match the unique terminal ID transmitted from the registration-requesting terminal, and the process proceeds to a step S605.

In the step S604, the CPU of the SIP server 105 updates the contents of the redirect destination terminal information based on the information received from the registration-requesting terminal MFP-A 101 requesting the registration of the candidate for the redirect destination, followed by terminating the present process. Specifically, the update of the contents of the redirect destination terminal information includes addition or deletion of a candidate or candidates for a redirect destination and update of the information of the redirect setting 414 in FIG. 4. The update of the information of the redirect setting 414 will be described hereinafter.

In the step S605, the CPU of the SIP server 105 notifies the registration-requesting terminal that the registration-requesting terminal is not permitted to register a candidate for a redirect destination, followed by terminating the present process. Specifically, the CPU of the SIP server 105 sends an error response indicating non-permission of registration of the registration-requesting terminal, to the REGISTER request transmitted from the registration-requesting terminal. In this case, the redirect destination terminal information is not updated at all.

As described above, the SIP server 105 determines whether or not the unique terminal ID "abc123" of the MFP-A 101 matches the unique terminal ID stored in the redirect destination information, to thereby perform authentication of the MFP-A 101. Then, the SIP server 105 accepts registration of the candidate(s) for the redirect destination from the authenticated MFP-A 101, and updates the redirect destination terminal information.

Next, a redirect destination setting request process executed by the MFP-C 103 when the user sets the redirect destination of FAX transmission to the FAX number "03-1111-1111" of the MFP-A 101, to the MFP-C 103, will be described with reference to FIG. 7. It is assumed in the present case that the user normally using the MFP-A 101 desires to receive fax transmission to the FAX number "03-1111-1111" of the MFP-A 101, by the MFP-C 103 outside the house or office of the user.

Figure 7:
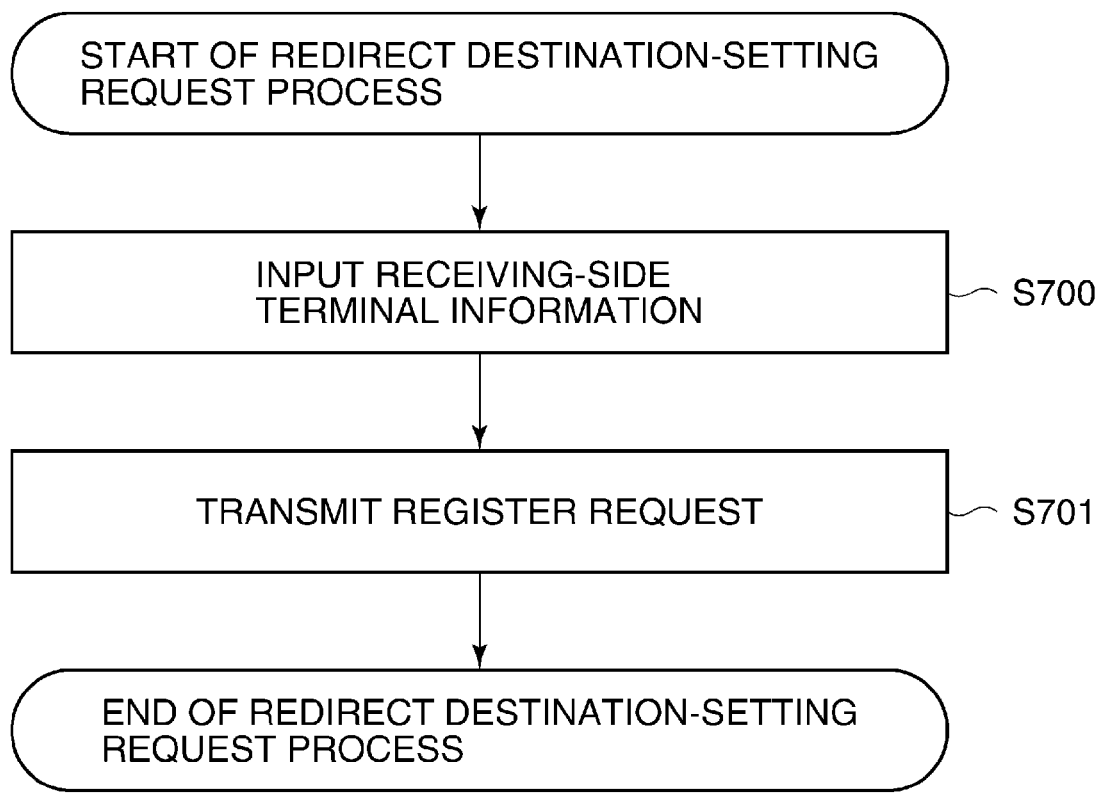
FIG. 7 is a flowchart of a redirect destination setting request process which is executed by an MFP when requesting the SIP server to set a redirect destination in the redirect destination information.

FIG. 7 is a flowchart of the destination destination-setting request process executed by an MFP (MFP-C 103 in the present example) when requesting the SIP server 105 to set a redirect destination in the redirect destination information. The steps in FIG. 7 are carried out by the CPU 201 of the MFP-C 103 which loads a program for the destination destination-setting request process stored in the ROM 208, the HDD 210 or the like of the MFP-C 103 into the RAM 209 of the same, and executes the program.

First, in a step S700, when the user inputs information on a receiving-side terminal, the process proceeds to a step S701. The information on a receiving-side terminal is intended to mean the terminal name and FAX number of the receiving-side terminal. In the present example, the information is that of the terminal name "MFP-A" and the FAX number "03-1111-1111". The user operates keys or the like of the display/operation section 203, to input the information on the receiving-side terminal.

In the step S701, the CPU of the MFP-C 103 transmits a REGISTER request to the SIP server 105, followed by terminating the present process. Specifically, the CPU of the MFP-C 103 transmits the receiving-side terminal name "MFP-A" and the receiving-side FAX number "03-1111-1111" input in the step S700, to the SIP server 105. Further, the CPU of the MFP-C 103 transmits the terminal name "MFP-C" and the IP address "11.11.11.33" of the MFP-C 103 as a setting-requesting terminal, to the SIP server 105.

Figure 8:
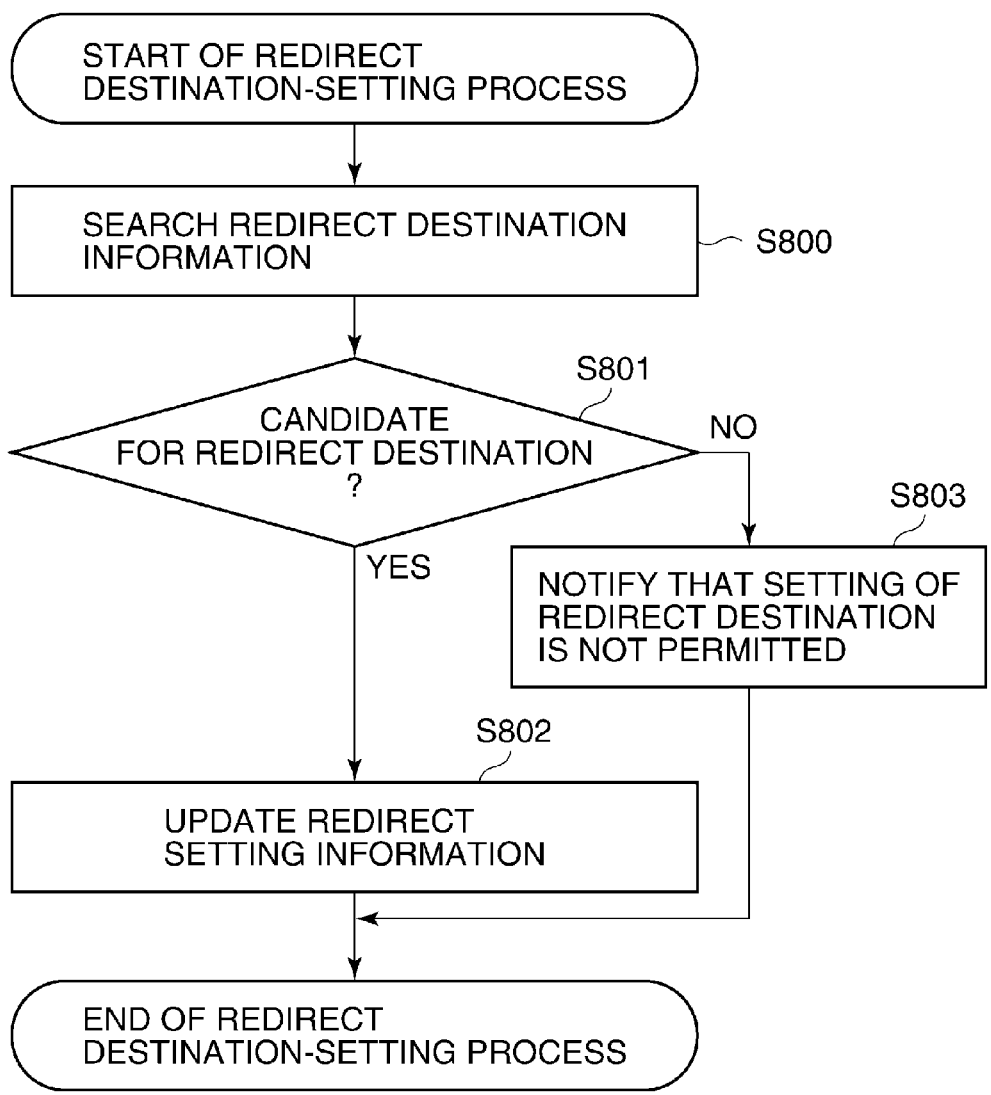
FIG. 8 is a flowchart of a redirect destination-setting process which is executed by the SIP server when requested by an MFP to set a redirect destination in the redirect destination information.

FIG. 8 is a flowchart of a redirect destination-setting process which is executed by the SIP server 105 when requested by an MFP (MFP-C 103 in the present example) to set a redirect destination in the redirect destination information. The steps in FIG. 8 are carried out by the CPU of the SIP server 105 which loads a program for the redirect destination-setting process stored in the ROM, the HDD or the like of the SIP server 105 into the RAM of the same, and executes the program.

When the CPU of the SIP server 105 receives a REGISTER request for setting a redirect destination (which is transmitted in the step S701 in FIG. 7) from the MFP-C 103 (in the present example), in a step S800, the CPU of the SIP server 105 searches the redirect destination information shown in FIG. 4, and the process proceeds to a step S801. Specifically, the CPU of the SIP server 105 searches for redirect destination terminal information associated with the terminal name and FAX number of the receiving-side terminal which have been transmitted from the setting-requesting terminal.

In the present example, it is assumed that the terminal name "MFP-A" and the FAX number "03-1111-1111" have been transmitted from the MFP-C 103, as mentioned above. Therefore, the CPU of the SIP server 105 searches the receiving-side terminal information 400 of the redirect destination information, for the terminal name "MFP-A" and the FAX number "03-1111-1111". When the redirect destination information has the contents shown in FIG. 4, the terminal name "MFP-A" and the FAX number "03-1111-1111" are found, and as the redirect destination terminal information associated with these, the terminal names "MFP-B" and "MFP-C" as the candidates for the redirect destination terminal for the receiving-side terminal name "MFP-A" are obtained.

In the step S801, the CPU of the SIP server 105 determines whether or not the setting-requesting terminal is among the candidate terminals for the redirect destination. Specifically, the CPU of the SIP server 105 determines whether or not the setting-requesting terminal exists in the redirect destination terminal information 410 of the redirect destination information acquired by the search in the step S800. In this case, the setting-requesting terminal is the MFP-C 103, and therefore the CPU of the SIP server 105 determines that the MFP-C 103 is a candidate terminal for the redirect destination for the receiving-side terminal MFP-A 101, and the process proceeds to a step S802.

On the other hand, if the setting-requesting terminal is other than the MFP-B 102 and the MFP-C 103, the CPU of the SIP server 105 determines that the terminal is not a candidate terminal for the redirect destination, and the process proceeds to a step S803.

In the step S802, the CPU of the SIP server 105 updates information on redirect setting, followed by terminating the present process. Here, the redirect setting is intended to mean the redirect setting 414 in the redirect destination information shown in FIG. 4.

If the setting-requesting terminal is a candidate terminal for the redirect destination, the CPU of the SIP server 105 updates the information of the redirect setting 414 of the redirect destination terminal in the redirect destination terminal information 410 to "set". The redirect destination terminal is a terminal that requests the SIP sever 105 to set the redirect destination. In the present example, it is the MFP-C 103.

In the step S803, the CPU of the SIP server 105 notifies the setting-requesting terminal that the setting of the redirect destination is not permitted, followed by terminating the present process. Specifically, the CPU of the SIP server 105 sends an error response indicating non-permission of the setting, to the REGISTER request transmitted from the setting-requesting terminal. In this case, the information of the redirect setting 414 is not updated at all.

As described above, when the SIP server 105 receives e.g. from the MFP-C 103 a request for setting a redirect destination, it determines using the redirect destination information whether or not the setting-requesting terminal is a candidate terminal for the redirect destination. If the setting-requesting terminal is a candidate terminal for the redirect destination, the SIP server 105 updates the information of the redirect setting 414 in the redirect destination information to "set".

Figure 9:
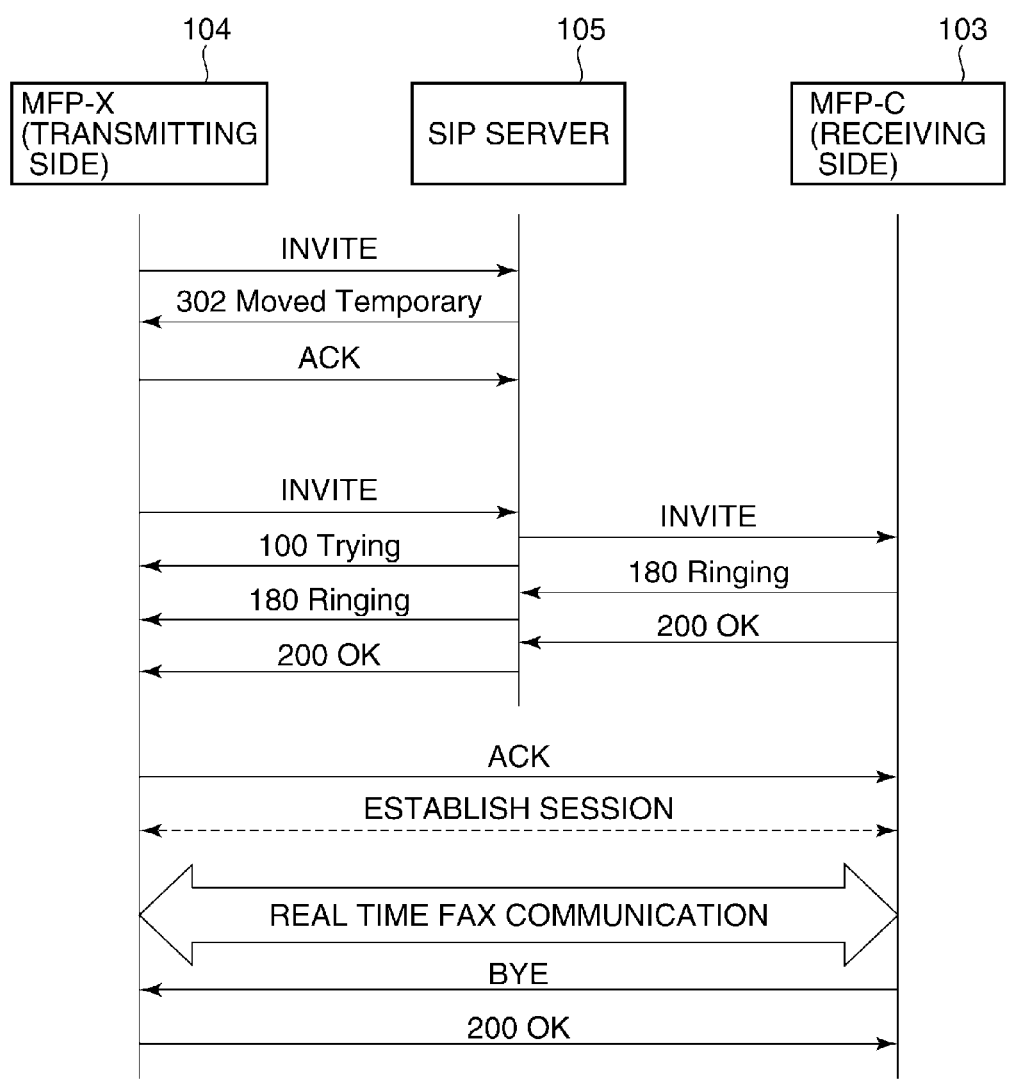
FIG. 9 is a sequence diagram useful in explaining operations carried out when facsimile is transmitted from an MFP-X to a FAX number of the MFP-A.

Next, operations carried out when a FAX is transmitted from the external MFP-X 104 to the FAX number "03-1111-1111" of the MFP-A 101 will be described with reference to FIG. 9. Let it be assumed that the information on the redirect setting (hereinafter referred to as "the redirect setting information") has the contents shown in FIG. 4.

First, when a FAX is transmitted from the MFP-X 104 to the FAX number "03-1111-1111" of the MFP-A 101, the MFP-X 104 transmits an INVITE request for requesting connection to the FAX number "03-1111-1111" to the SIP server 105.

In response to the INVITE request, the SIP server 105 sends a redirect response, i.e. a 302 Moved Temporary Response to the MFP-X 104. At this time, the SIP server 105 refers to the redirect setting information, and sends not only the 302 Moved Temporary Response but also an IP address of the redirect destination terminal for the FAX number "03-1111-1111" of the MFP-A 101 to the MFP-X 104. The redirect setting information has the contents shown in FIG. 4, and hence in this case, the IP address 413 "11.11.11.33" of the MFP-C 103 which is set to "set" in the column of the redirect setting 414 is sent back to the MFP-X 104.

Then, the MFP-X 104 transmits a confirmation response "ACK" to the SIP server 105 as a response to the 302 Moved Temporary Response. Further, in reply to the redirect response and the IP address of the redirect destination terminal, the MFP-X 104 transmits an INVITE request to the SIP server 105 again. This IP address 413 of the redirect destination terminal is the above-mentioned received IP address, i.e. the IP address "11.11.11.33" of the MFP-C 103.

The SIP server 105 routes the above-mentioned INVITE request, and transmits an INVITE request to the MFP-C 103, which is the redirect destination. Further, the SIP server 105 provisionally sends a 100 Trying Response to the MFP-X 104, thereby notifying the MFP-X 104 that the SIP server 105 is trying connection to the MFP-C 103.

Upon reception of the INVITE request from the SIP server 105, the MFP-C 103 starts a FAX receiving process, and sends a 180 Ringing Response, which means that a callee being alerted, to the SIP server 105.

The SIP server 105 routes the above-mentioned 180 Ringing Response, thereby transmitting the same to the MFP-X 104. The MFP-C 103 starts a FAX receiving process, and sends a 200 OK Response to the MFP-X 104 via the SIP server 105. Upon reception of the 200 OK Response, the MFP-X 104 sends ACK indicative of receipt of the 200 OK Response to the MFP-C 103.

When the ACK is received by the MFP-C 103, a session is established between the MFP-X 104 and the MFP-C 103, whereafter real-time FAX communication compliant with ITU-T Recommendation T.38 is performed. After termination of FAX reception by the MFP-C 103, SIP method BYE is transmitted from the MFP-C 103 to the MFP-X 104. The 200 OK Response to this BYE is sent from the MFP-X 104 to MFP-C 103, followed by terminating the session.

As described above, the redirect destination for the MFP-A 101 registered in the column of the terminal name 401 of the receiving-side terminal information 400 in FIG. 4 becomes the terminal MFP-C 103 for which the redirect setting 414 of the redirect destination terminal information 410 is set to "set".

Next, there will be described cancellation of the setting of a redirect destination e.g. for the MFP-A 101, that is, a case in which the redirect destination is reset such that the MFP-A 101 receives FAX transmission to the MFP-A 101 without redirecting the FAX transmission.

The cancellation of the setting of the redirect destination is permitted to be performed from any of the terminals registered in the receiving-side terminal information 400 and the redirect destination terminal information 410 shown in FIG. 4. Assuming that the contents of redirect destination information are as shown in FIG. 4, the cancellation of the setting of the redirect destination for the MFP-A 101 is permitted from any of the receiving-side terminal MFP-A 101 and the redirect destination terminals MFP-B 102 and MFP-C 103.

When cancelling the setting of the redirect destination, the user operates keys or the like of the display/operation section 203 of a terminal permitted to cancel the setting of the redirect destination, thereby giving the same an instruction for cancelling the setting of the redirect destination for the MFP-A 101.

The terminal having received the instruction for cancelling the setting of the redirect destination requests the SIP server 105 to cancel the setting of the redirect destination. In response to this request, the SIP server 105 searches the redirect destination information, for the terminal name and the IP address of the requesting terminal. If the terminal name and the IP address of the requesting terminal exist in the redirect destination information, the SIP server 105 sets all the information items of the redirect setting 414, associated with the terminals in the redirect destination terminal information 410 in FIG. 4, to "not set".

By setting all the information in the column of the redirect setting 414 to "not set", the setting of the redirect destination for the MFP-A 101 is cancelled. In a state where the setting of the redirect destination for the MFP-A 101 is canceled, the SIP server 105 does not send a redirect response. Therefore, FAX transmission to the MFP-A 101 is received by the MFP-A 101 without any redirect operation being performed.

As described hereinabove, according to the present embodiment, the SIP server 105 accepts registration of a candidate for a redirect destination from an authenticated MFP (MFP-A 101 in the above-described example), and updates the redirect destination terminal information. Then, the user requests the SIP server 105 to set the redirect destination for the MFP-A 101, e.g. from the MFP-C 103 out of the MFP-B 102 and MFP-C 103 which are registered as candidates for the redirect destination for the MFP-A 101.

The SIP server 105 having received the request updates information associated with the MFP-C 103 in the redirect setting 414 in the redirect destination information to "set". According to the setting of "set" in the redirect setting 414, the SIP server 105 sends a redirect response to FAX transmission e.g. from the MFP-X 104 to the FAX number "03-1111-1111" of the MFP-A 101. As the redirect response to the MFP-X 104, the SIP server 105 sends the IP address "11.11.11.33" of the MFP-C 103, which is the redirect destination, to the MFP-X 104.

The MFP-X 104 transmits an INVITE request to the MFP-C 103 i.e. the redirect destination, to thereby request connection between the MFP-X 104 and the MFP-C 103. After that, a session is established between the MFP-X 104 and the MFP-C 103 for FAX transmission.

This series of operations make it possible for the user to set the redirect destination of FAX transmission to the FAX number "03-1111-1111" of the MFP-A 101, to the MFP-C 103, whereby it is possible to receive FAX transmission to the FAX number "03-1111-1111" of the MFP-A 101 by the MFP-C 103.

Although in the present embodiment, the description has been given of a case where the redirect destination is set to the MFP-C 103, it is also possible to request, from the MFP-B 102, the SIP server 105 to set the redirect destination to thereby set the MFP-B 102 as the redirect destination. In this case, it is only required to set the redirect setting 414 associated with the terminal name 411 of the redirect destination terminal information 410 in FIG. 4, to "set".

As described above, according to the present embodiment, the SIP server 105 accepts registration of a plurality of candidates (the MFP-B 102 and the MFP-C 103 in the case of the above-described example) for the redirect destination, from the authenticated terminal MFP-A 101. This makes it possible to set a user-desired one of a plurality of registered candidates for a redirect destination, as the redirect destination. As a consequence, a connection request to the MFP-A 101 is redirected to the redirect destination set as above.

Further, when the SIP server 105 has received a redirect destination-setting request from a terminal which is not registered as a candidate for the redirect destination for the MFP-A 101, it is possible to prevent the terminal from being set as the redirect destination. This makes it possible to prevent FAX from being redirected to a terminal that is not registered by the user.

Next, a communication system according to a second embodiment of the present invention will be described with reference to FIGS. 10 to 12. Component parts and elements identical to those of the first embodiment are denoted by identical reference numerals.

Figure 10:
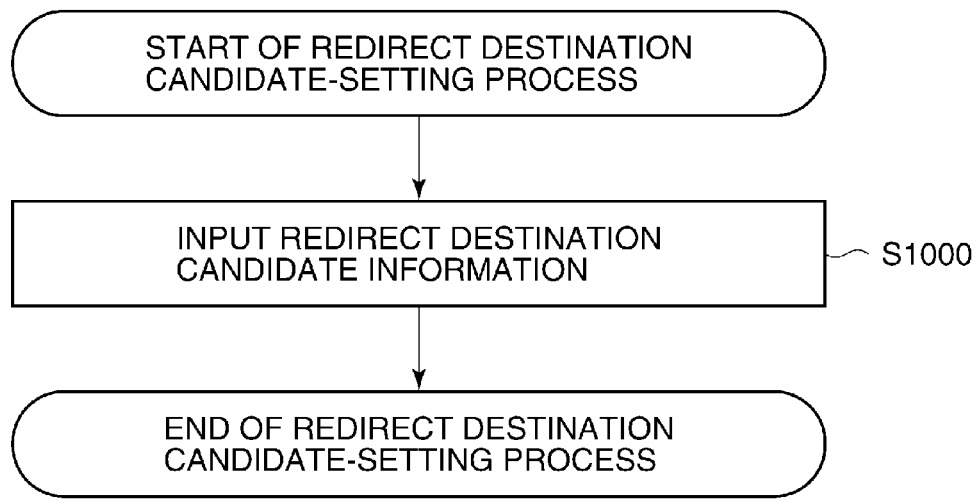
FIG. 10 is a flowchart of a redirect destination candidate-setting process which is executed by an MFP in a communication system according to a second embodiment of the present invention when a user sets candidates for a redirect destination for the MFP by operating the MFP.

FIG. 10 is a flowchart of a redirect destination candidate-setting process which is executed by an MFP (MFP-A in the present example) when the user sets candidates for a redirect destination for the MFP by operating the MFP. To set a candidate for the redirect destination of FAX transmission to the FAX number "03-1111-1111" of the MFP-A 101, the user inputs information on a desired candidate for the redirect destination (step S1000). The user operates keys or like of the display/operation section 203 to thereby input the information on the desired candidate for the redirect destination. The information on the redirect destination is that of the terminal name and the IP address of a desired redirect destination terminal.

Now, a description will be given of a case where the MFP-B 102 and the MFP-C 103 are set as candidates for the redirect destination for the MFP-A 101. In this case, the user inputs the terminal name "MFP-B" and the IP address "11.11.11.22" of the MFP-B 102, and the terminal name "MFP-C" and the IP address "11.11.11.33" of the MFP-C 103. The information on candidates for the redirect destination (hereinafter referred to as "the redirect destination candidate information") input to the MFP-A 101 is stored in the HDD 210 of the MFP-A 101.

Next, a description will be given of an operation performed from the MFP-C 103, for setting the redirect destination of FAX transmission to the FAX number "03-1111-1111" of the MFP-A 101, to the MFP-C 103.

The user inputs information on the receiving-side terminal by operating the MFP-C 103. After the information on the receiving-side terminal is input, the MFP-C 103 transmits a REGISTER request to the SIP server 105. This series of operations is the same as described with reference to FIG. 7 in the above-described first embodiment. Specifically, the terminal name "MFP-A" and the FAX number "03-1111-1111" of the receiving-side terminal, and the terminal name "MFP-C" and the IP address "11.11.11.33" of the setting-requesting terminal are transmitted to the SIP server 105.

Figure 11:
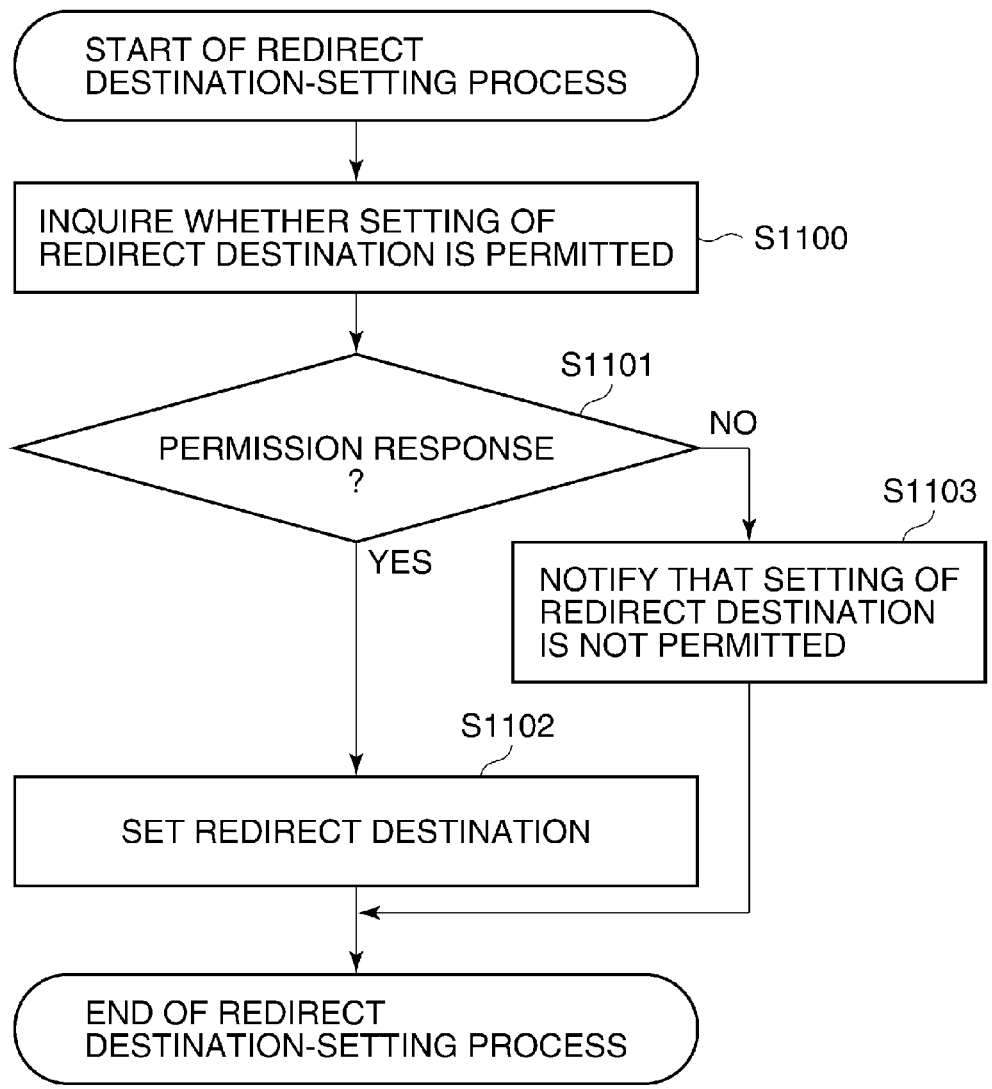
FIG. 11 is a flowchart of a redirect destination-setting process which is executed by the SIP server when requested by an MFP to set a redirect destination.

FIG. 11 is a flowchart of a redirect destination-setting process which is executed by the SIP server 105 when requested by an MFP (MFP-C 103 in the present example) to set a redirect destination. The steps in FIG. 11 are carried out by the CPU of the SIP server 105 which loads a program for the redirect destination-setting process stored in the ROM, the HDD or the like, not shown, of the SIP server 105 into the RAM of the same, and executes the program.

In a step S1100, when the CPU of the SIP server 105 receives the REGISTER request transmitted from the MFP-C 103, the CPU of the SIP server 105 inquires of the MFP-A 101 whether or not the setting of the redirect destination to the MFP-C 103 is permitted, and then the process proceeds to a step S1101. When making the above-mentioned inquiry, the CPU of the SIP server 105 transmits the information of the name and the IP address of the setting-requesting terminal to the MFP-A 101. In the present case, the setting-requesting terminal name "MFP-C" and the IP address "11.11.11.33" are transmitted.

In response to the inquiry as to the permission for setting of the redirect destination, the MFP-A 101 transmits a response indicative of permission or non-permission for setting of the redirect destination, to the SIP server 105. The response indicative of permission or non-permission for setting of the redirect destination, which is transmitted from the MFP-A 101, will be described hereinafter.

In the step S1101, the CPU of the SIP server 105 determines whether or not the response from the MFP-A 101 is one permitting the setting of the redirect destination. If the response from the MFP-A 101 is one permitting the setting of the redirect destination, the process proceeds to a step S1102, whereas if the response from the MFP-A 101 is not one permitting the setting of the redirect destination, the process proceeds to a step S1103.

In the step S1102, the CPU of the SIP server 105 sets the redirect destination of FAX transmission to the FAX number "03-1111-1111" of the MFP-A 101, to the MFP-C 103, followed by terminating the present process. Specifically, the CPU of the SIP server 105 sets the redirect destination to the setting-requesting terminal name "MFP-C" and the IP address "11.11.11.33" set forth in the redirect destination-setting request received from the MFP-C 103.

In the step S1103, the CPU of the SIP server 105 notifies the setting-requesting terminal that the setting of the redirect destination is not permitted, followed by terminating the present process.

Specifically, the CPU of the SIP server 105 sends an error response indicating non-permission for setting the redirect destination, to the REGISTER request transmitted from the registration-requesting terminal. In this case, the redirect destination is not changed at all.

Figure 12:
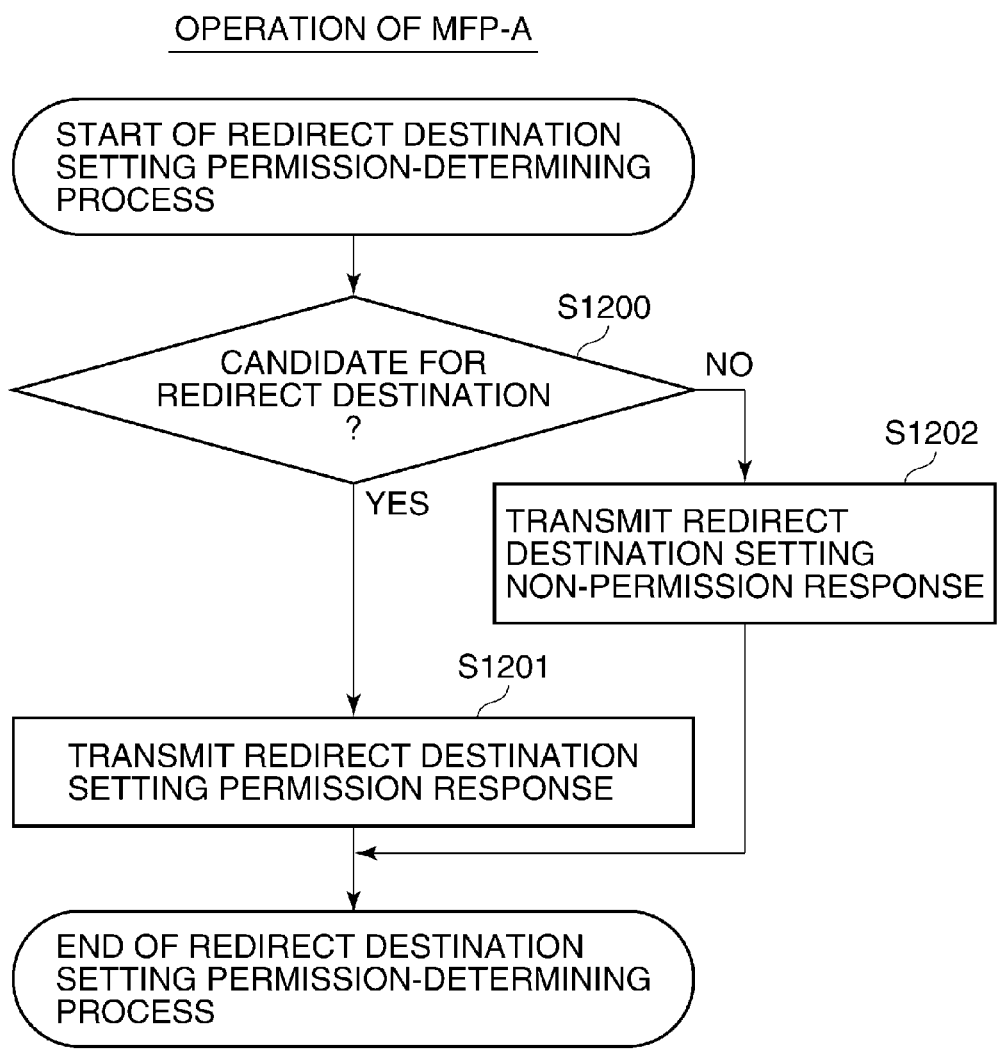
FIG. 12 is a flowchart of a redirect destination setting permission-determining process executed by an MFP when notified by the SIP server in the redirect destination-setting process in FIG. 11 of an inquiry as to whether or not to permit setting of a redirect destination, for determining whether or not to permit the setting.

FIG. 12 is a flowchart of a redirect destination setting permission-determining process executed by an MFP (MFP-A 101 in the present example) when notified by the SIP server 105 in the step S1100 in FIG. 11 of an inquiry as to whether or not to permit setting of a redirect destination, for determining whether or not to permit the setting. The steps in FIG. 12 are carried out by the CPU 201 of the MFP-A 101 which loads a program for the redirect destination setting permission-determining process stored in the ROM 208, the HDD 210 or the like of the MFP-A 101 into the RAM 209 of the same, and executes the program. In the present example, as described hereinabove, when the MFP-A 101 has been notified of the inquiry as to permission or non-permission for setting the redirect destination from the SIP server 105, the MFP-A 101 receives the information of the name "MFP-C" and the IP address "11.11.11.33" of the setting-requesting terminal.

In a step S1200, the CPU of the MFP-A 101 determines whether or not the setting-requesting terminal is a candidate for the redirect destination, based on the received terminal name and IP address of the setting-requesting terminal. Specifically, the CPU of the MFP-A 101 determines whether or not the information on the setting-requesting terminal is included in the redirect destination candidate information stored in the HDD 210 of the MFP-A 101 by the destination candidate-setting process in FIG. 10.

If the information on the setting-requesting terminal is included in the redirect destination candidate information, the CPU of the MFP-A 101 determines that the setting-requesting terminal is a candidate for the redirect destination, and then the process proceeds to a step S1201. On the other hand, if the information on the setting-requesting terminal is not included in the redirect destination candidate information, the CPU of the MFP-A 101 determines that the setting-requesting terminal is not a candidate for the redirect destination, and then the process proceeds to a step S1202.

Assuming that the HDD 210 of the MFP-A 101 stores the terminal name "MFP-B" and the IP address "11.11.11.22" and the terminal name "MFP-C" and the IP address "11.11.11.33" in the redirect destination candidate information, as in the above-described example, since the terminal name and the IP address of the setting-requesting terminal received by the MFP-A 101 are the "MFP-C" and "11.11.11.33", respectively, it is determined that the MFP-C is a candidate for the redirect destination.

In the step S1201, the CPU of the MFP-A 101 transmits a response permitting setting of the redirect destination, to the SIP server 105, followed by terminating the present process.

In the step S1202, the CPU of the MFP-A 101 transmits a response not permitting setting of the redirect destination, to the SIP server 105, followed by terminating the present process.

As described above, in the present embodiment, the SIP server 105 receives e.g. from the MFP-C 103 a request for setting a redirect destination, and inquires of the MFP-A 101 whether or not to permit setting of the redirect destination. The MFP-A 101 determines whether or not the setting-requesting terminal is a candidate for the redirect destination, based on the redirect destination candidate information stored in the HDD 210. If the setting-requesting terminal is a candidate for the redirect destination, the MFP-A 101 sends a response permitting setting of the redirect destination, to the SIP server 105.

Upon reception of the response permitting setting of the redirect destination, the SIP server 105 sets the redirect destination of FAX transmission to the FAX number "03-1111-1111" of the MFP-A 101, to the MFP-C 103. According to the setting of the redirect destination, the SIP server 105 gives a redirect response to FAX transmission from the MFP-X 104 intended to the FAX number "03-1111-1111" of the MFP-A 101. As the redirect response, the SIP server 105 sends the IP address "11.11.11.33" of the MFP-C 103 as the redirect destination, to the MFP-X 104.

After that, similarly to the first embodiment, a session is established between the MFP-X 104 and the MFP-C 103 for FAX transmission. This series of operations make it possible for the user to set, from the MFP-C 103, the redirect destination of FAX transmission to the FAX number "03-1111-1111" of the MFP-A 101, to the MFP-C 103, whereby it is possible to receive FAX transmission to the FAX number "03-1111-1111" of the MFP-A 101, by the MFP-C 103.

Although in the present embodiment, the description has been given of a case where the redirect destination is set to the MFP-C 103, it is also possible for the user to send a request for setting the redirect destination from the MFP-B 102 to the SIP server 105 to thereby set the MFP-B 102 as the redirect destination.

As described hereinabove, according to the present embodiment, one of a plurality of redirect destination candidates in the redirect destination candidate information which is input in advance by the user and stored in the HDD 210 of the MFP-A 101, can be set as the redirect destination.

Further, when a redirect destination-setting request is transmitted from a terminal which is not set forth in the redirect destination candidate information stored in the HDD 210 of the MFP-A 101 as a candidate for the redirect destination, it is possible to prevent the terminal from being set as the redirect destination. This makes it possible to prevent FAX from being redirected to a terminal which the user has not stored in the redirect destination candidate information in the HDD 210 of the MFP-A 101.

Although in the present embodiment, the determination in the step S1200 in FIG. 12 as to whether or not the setting-requesting terminal is a candidate for the redirect destination is performed based on the redirect destination candidate information which is input in advance by the user and stored in the HDD 210 of the MFP-A 101, this is not limitative, but for example, when the setting of a redirect destination is requested e.g. by the MFP-C 103, a screen may be displayed on the display/operation section 203 of the MFP-A 101, for inquiring of the user whether or not to permit setting of the MFP-C 103 as a redirect destination of a connection request to the MFP-A 101. In this case, a response to the SIP server 105 is transmitted according to an instruction input by the user via the displayed screen.

Further, although in the present embodiment, before the MFP-C 103 is set as the redirect destination of the connection request to the MFP-A 101, the SIP server 105 inquires of the MFP-A 101 whether or not to permit setting of the redirect destination, by way of example, this is not limitative, but another configuration may be employed. Specifically, the SIP server 105 may be configured such that upon reception of the redirect destination-setting request from the MFP-C 103, the SIP server 105 not only sets the MFP-C 103 as the redirect destination but also notifies the MFP-A 101 of the fact. Thus, the user of the MFP-A 101, having received the notification, can recognize the fact that data to be originally intended to be transmitted to the MFP-A 101 has been redirected. Further, when the user of the MFP-A 101 does not desire to set the redirection, it is possible to cancel the setting.

Next, a communication system according to a third embodiment of the present invention will be described with reference to FIGS. 13 to 15. Component parts and elements identical to those of the above-described first embodiment are denoted by identical reference numerals.

Figure 13:
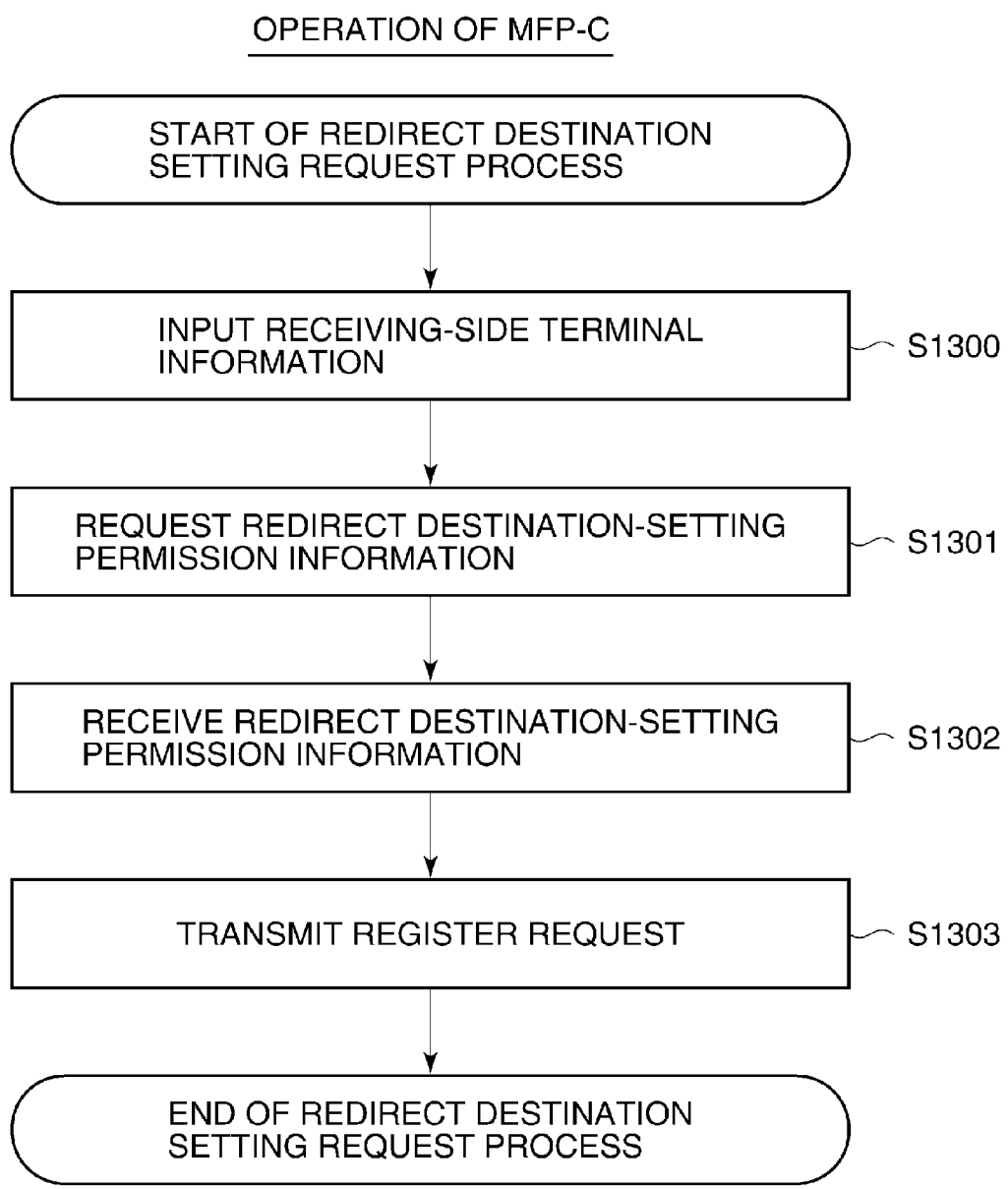
FIG. 13 is a flowchart of a redirect destination setting request process executed by one of MFPs in a communication system according to a third embodiment of the present invention, for requesting another of the MFPs to set a redirect destination.

FIG. 13 is a flowchart of a redirect destination setting request process executed by an MFP (MFP-C 103 in the present example) for requesting another MFP (MFP-A 101 in the present example) to set a redirect destination. The steps in FIG. 13 are carried out by the CPU 2 of the MFP-C 103 which loads a program for the redirect destination setting request process stored in the ROM 208, the HDD 210 or the like of the MFP-C 103 into the RAM 209 of the same, and executes the program.

First, when redirecting FAX to the FAX number "03-1111-1111" of the MFP-A 101, to the MFP-C 103, the user operates keys or the like of the display/operation section 203 to thereby input information on a receiving-side terminal. In the present example, the user inputs the information of the terminal name "MFP-A" and the FAX number "03-1111-1111" of the receiving-side terminal.

When the user inputs the information on the receiving-side terminal in a step S1300, the process proceeding to a step 1301.

In the step S1301, the CPU of the MFP-C 103 requests the terminal MFP-A 101 having the terminal name "MFP-A" input in the step S1300 to send redirect destination-setting permission information, and then the process proceeds to a step S1302. The redirect destination-setting permission information will be described hereinafter.

In the step S1302, the CPU of the MFP-C 103 receives the redirect destination-setting permission information from the MFP-A 101, and then the process proceeds to a step S1303.

In the step S1303, the CPU of the MFP-C 103 transmits a REGISTER request to the SIP server 105, followed by terminating the present process.

Using the REGISTER request, the terminal name "MFP-A" and the FAX number "03-1111-1111" of the receiving-side terminal are transmitted from the MFP-C 103 to the SIP server 105. Further, using the REGISTER request, the MFP-C 103 also transmits the terminal name "MFP-C" and the IP address "11.11.11.33" of the MFP-C 103 as the setting-requesting terminal, to the SIP server 105. Further, using the REGISTER request, the MFP-C 103 also transmits the redirect destination-setting permission information received from the MFP-A 101, to the SIP server 105.

Figure 14:
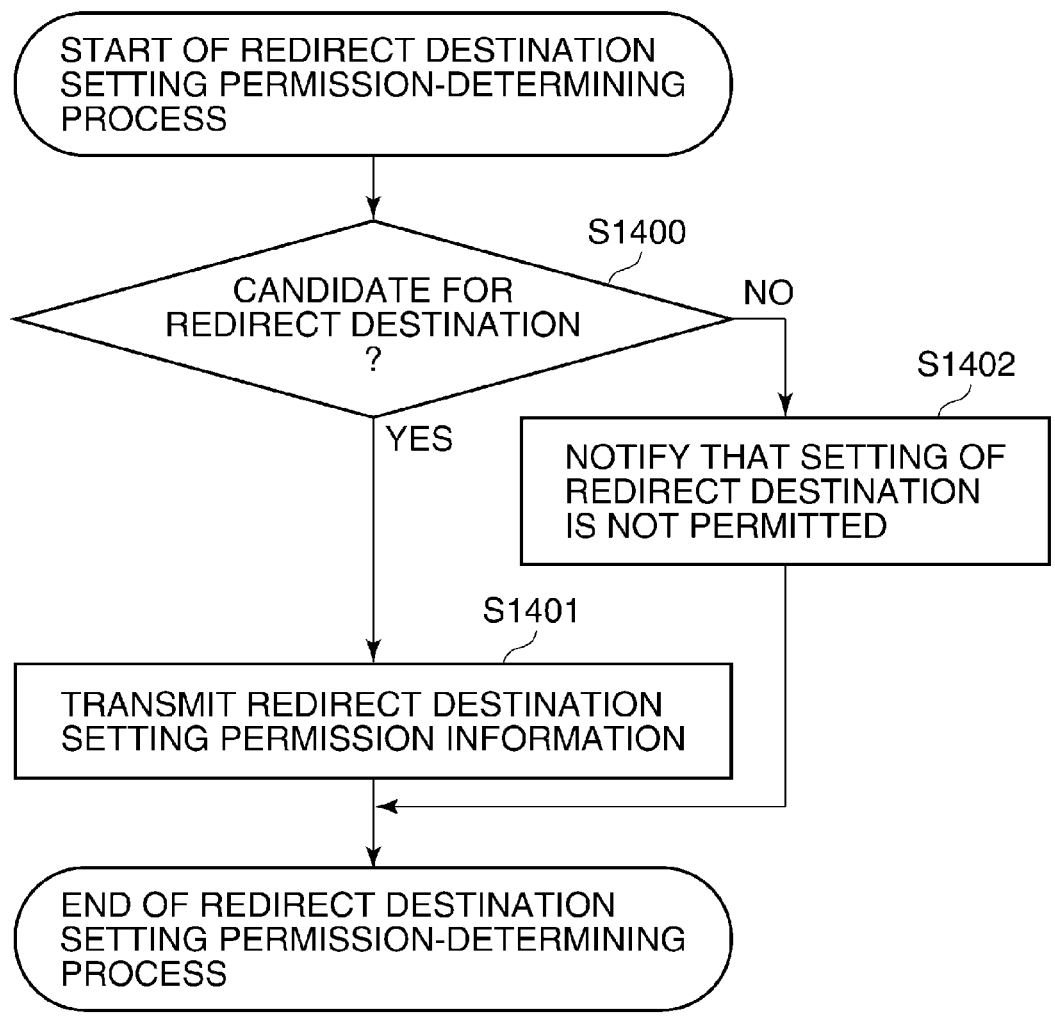
FIG. 14 is a flowchart of a redirect destination setting permission-determining process executed by an MFP when requested by another MFP, for redirect destination setting permission information.

FIG. 14 is a flowchart of a redirect destination setting permission-determining process executed by an MFP (MFP-A 101 in the present example) when requested by another MFP (MFP-C 103 in the present example), for redirect destination setting permission information. The steps in FIG. 14 are carried out by the CPU 201 of the MFP-A 101 which loads a program for the redirect destination setting permission-determining process stored in the ROM 208, the HDD 210 or the like of the MFP-A 101 into the RAM 209 of the same, and executes the program.

In a step S1400, the CPU of the MFP-A 101 determines whether or not to permit setting of a redirect destination. This determination is performed for a terminal requesting the redirect destination-setting permission information, by determining whether or not the terminal is a candidate for the redirect destination (S1400). If the CPU of the MFP-A 101 determines that the terminal is a candidate for the redirect destination, the process proceeds to a step S1401, whereas if the CPU of the MFP-A 101 determines that the terminal is not a candidate for the redirect destination, the process proceeds to a step S1402.

Similarly to the above-described second embodiment, these determinations are performed based on redirect destination candidate information which is input in advance by the user and stored in the HDD 210 of the MFP-A 101. In the present example, it is assumed that the HDD 210 of the MFP-A 101 stores the terminal name "MFP-B" and the IP address "11.11.11.22" and the terminal name "MFP-C" and the IP address "11.11.11.33" as the redirect destination candidate information. Since the terminal requesting the redirect destination-setting permission information from the MFP-A 101 is the MFP-C, and as described above, the MFP-C 103 is stored as an item of the redirect destination candidate information, it is determined that the MFP-C 103 is a candidate for the redirect destination.

In the step S1401, the CPU of the MFP-A 101 transmits the redirect destination-setting permission information to the MFP-C 103, followed by terminating the present process.

In the step S1402, the CPU of the MFP-A 101 notifies the MFP-C 103 that the setting of a redirect destination is not permitted, followed by terminating the present process.

Now, a description will be given of the redirect destination-setting permission information. The redirect destination-setting permission information certifies that permission for setting the redirect destination has been received from the receiving-side terminal. To ensure the security of the redirect destination-setting permission information, the information is encrypted.

In the description of the operation of the MFP-C 103 for receiving the redirect destination-setting permission information in the step S1302 in FIG. 13, it is assumed that the redirect destination-setting permission information is transmitted from the MFP-A 101. However, when the redirect destination-setting permission information is requested in the step S1301 by a terminal which is not stored in the HDD 210 of the MFP-A 101 as an item of the redirect destination candidate information, the redirect destination-setting permission information is not transmitted from the MFP-A 101.

Figure 15:
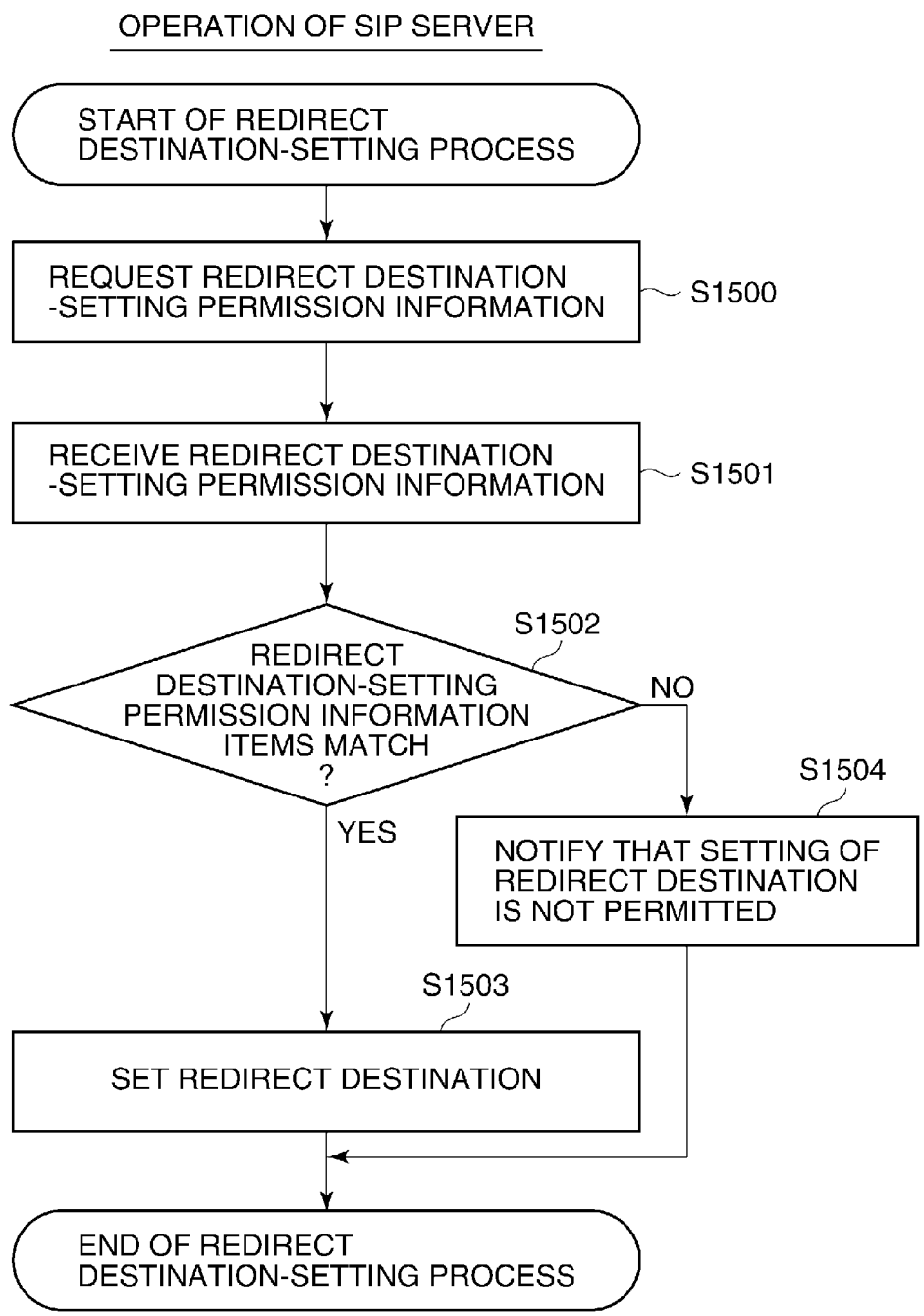
FIG. 15 is a flowchart of a redirect destination-setting process which is executed by the SIP server when requested by an MFP to set a redirect destination.

FIG. 15 is a flowchart of a redirect destination-setting process which is executed by the SIP server 105 when requested by an MFP (MFP-C 103 in the present example) to set a redirect destination. The steps in FIG. 15 are carried out by the CPU of the SIP server 105 which loads a program for the redirect destination-setting process stored in the ROM, the HDD or the like, not shown, of the SIP server 105 into the RAM of the same, and executes the program.

In a step S1500, the CPU of the SIP server 105 requests a receiving-side terminal (MFP-A in the present example) notified from the MFP-C 103, for redirect destination-setting permission information, and the process proceeds to a step S1501.

In the step S1501, the CPU of the SIP server 105 receives the redirect destination-setting permission information returned from the MFP-A 101, and then the process proceeds to a step S1502. It should be noted that in the case where the redirect destination-setting permission information is requested by the SIP server 105, the MFP-A 101 does not perform such determination of whether or not the requesting terminal is a candidate for the redirect destination, as described hereinabove.

In the step S1502, the CPU of the SIP server 105 determines whether or not the redirect destination-setting permission information in the REGISTER request received from the MFP-C 103 matches the redirect destination-setting permission information received from the MFP-A 101. This determination is performed after decryption and checking of the two items of the redirect destination-setting permission information.

When the two items of the redirect destination-setting permission information match each other, the process proceeds to a step S1503, whereas when they do not match each other, the process proceeds to a step S1504.

The case where the two items of the redirect destination-setting permission information match each other corresponds to the case where the request for setting the redirect destination is received from the MFP-C 103. As descried heretofore, the MFP-C 103 acquires the redirect destination-setting permission information from the MFP-A 101, and transmits the acquired redirect destination-setting permission information to the SIP server 105. Therefore, the redirect destination-setting permission information received from the MFP-C 103 and the redirect destination-setting permission information received from the MFP-A 101 match each other.

In the step S1503, the CPU of the SIP server 105 sets the redirect destination for the FAX number "03-1111-1111" of the MFP-A 101, followed by terminating the present process.

Specifically, the CPU of the SIP server 105 sets the redirect destination to the terminal name "MFP-C" and the IP address "11.11.11.33" of the setting-requesting terminal received when requested to set the redirect destination.

In the step S1504, the CPU of the SIP server 105 notifies the registration-requesting terminal that the setting of the redirect destination is not permitted, followed by terminating the present process.

Specifically, the CPU of the SIP server 105 sends an error response indicating non-permission of the setting of the redirect destination, to the REGISTER request transmitted from the registration-requesting terminal. In this case, the redirect destination is not changed at all.

As described above, according to the present embodiment, the MFP-C 103 requests the MFP-A 101 to send redirect destination-setting permission information. In response to this request, the MFP-A 101 determines whether or not the request terminal MFP-C 103 is a candidate for the redirect destination. If the request terminal MFP-C 103 is a candidate for the redirect destination, the MFP-A 101 transmits the redirect destination-setting permission information to the request terminal MFP-C 103. When transmitting the REGISTER request for requesting the SIP server 105 to set the redirect destination, the request terminal MFP-C 103 also transmits the redirect destination-setting permission information received from the MFP-A 101.

The SIP server 105 requests the MFP-A 101, FAX transmission to which is to be redirected, to transmit redirect destination-setting permission information, and receives the redirect destination-setting permission information returned from the MFP-A 101. Further, the SIP server 105 determines whether or not the redirect destination-setting permission information received from the MFP-C 103 together with the REGISTER request and the redirect destination-setting permission information received from the MFP-A 101 match each other. If they match each other, the SIP server 105 sets the redirect destination for the FAX number "03-1111-1111" of the MFP-A 101 to the MFP-C 103.

Further, the SIP server 105 sends a redirect response to FAX transmission from the MFP-X 104 to the FAX number "03-1111-1111" of the MFP-A 101 according to the setting of the redirect destination. Using the redirect response, the SIP server 105 sends the IP address "11.11.11.33" of the redirect destination MFP-C 103 to the MFP-X 104. The following operations are the same as those of the first embodiment.

This series of operations make it possible for the user to set the redirect destination of FAX to the FAX number "03-1111-1111" of the MFP-A 101, to the MFP-C 103, whereby it is possible to receive FAX transmission to the FAX number "03-1111-1111" of the MFP-A 101, by the MFP-C 103.

Although in the present embodiment, the description has been given of a case where the redirect destination is set to the MFP-C 103, it is possible to request the MFP-A 101 to send redirect destination-setting permission information using the MFP-B 102 to set the MFP-B 102 as the redirect destination.

As described heretofore, according to the present embodiment, one of a plurality of candidates for a redirect destination in redirect destination candidate information which is input in advance by the user and stored in the HDD 210 of the MFP-A 101, can be set as the redirect destination.

Further, when a redirect destination-setting request is transmitted from a terminal which is not stored in the HDD 210 of the MFP-A 101 as a candidate for the redirect destination, it is possible to prevent the terminal from being set as the redirect destination. This makes it possible to prevent FAX from being redirected to a terminal that is not stored in the redirect destination candidate information in the HDD 210 of the MFP-A 101.

Although in the present embodiment, the determination in the step S1400 in FIG. 14 as to whether or not the setting-requesting terminal is a candidate for the redirect destination is performed based on the redirect destination candidate information which is input in advance by the user and stored in the HDD 210 of the MFP-A 101, this is not limitative, but for example, when the setting of a redirect destination is requested e.g. by the MFP-C 103, a screen may be displayed on the display/operation section 203 of the MFP-A 101, for inquiring of the user whether or not to permit setting of the MFP-C 103 as a redirect destination of a connection request to the MFP-A 101. In this case, the redirect destination setting permission information is transmitted to the MPF-C 103 according to an instruction input by the user via the displayed screen.

It should be noted that the present invention is not limited to the above-described embodiment, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 network
101 MFP-A
102 MFP-B
103 MFP-C
104 MFP-X
105 SIP server
201 CPU
203 display/operation section
204 scanner section
205 printer section
206 IP packet generation/analysis section
207 image conversion controller
208 ROM
209 RAM
210 HDD
213 network interface section
214 T.38 protocol generation/analysis section

The invention claimed is:

1. A communication system in which a plurality of terminals including at least a first terminal and a second terminal and a server are connected to each other via a communication line, for performing data communication using a predetermined communication control protocol,
wherein the server comprises:
a response unit configured to transmit address information of the first terminal to an external apparatus when the server receives a connection request to the first terminal from the external apparatus;
a storage unit configured to store information indicative of a terminal which can be set as the redirect destination of the connection request to the first terminal;
a determination unit configured to determine whether or not to permit the second terminal to be set as a redirect destination of the connection request to the first terminal when the server received from the second terminal a request for setting the second terminal as the redirect destination;
a setting unit configured to set the second terminal as the redirect destination of the connection request to the first terminal when it is determined by said determination unit that the second terminal is permitted to be set as the redirect destination of the connection request to the first terminal; and
a control unit configured to control said response unit such that said response unit transmits a response of address information of the second terminal when the server receives the connection request to the first terminal in a state where the second terminal is set as the redirect destination of the connection request to the first terminal by said setting unit,
wherein said determination unit determines that the second terminal is permitted to be set as the redirect destination of the connection request to the first terminal when information indicative of the second terminal is stored in said storage unit, whereas when no information indicative of the second terminal is stored in said storage unit, said determination unit determines that the second terminal is not permitted to be set as the redirect destination of the connection request to the first terminal, and wherein at least one of the response unit, the storage unit, the determination unit, the setting unit, and the control unit is implemented by a processor and a memory.

2. The communication system according to claim 1, wherein the server receives the information indicative of a terminal which can be set as the redirect destination of the connection request to the first terminal, from the first terminal, and stores the received information in said storage unit.

3. A communication system in which a plurality of terminals including at least a first terminal and a second terminal and a server are connected to each other via a communication line, for performing data communication using a predetermined communication control protocol, wherein the server comprises:

a response unit configured to transmit address information of the first terminal to an external apparatus when the server receives a connection request to the first terminal from the external apparatus;

a determination unit configured to determine whether or not to permit the second terminal to be set as a redirect destination of the connection request to the first terminal when the server received from the second terminal a request for setting the second terminal as the redirect destination;

a setting unit configured to set the second terminal as the redirect destination of the connection request to the first terminal when it is determined by said determination unit that the second terminal is permitted to be set as the redirect destination of the connection request to the first terminal; and a control unit configured to control said response unit such that said response unit transmits a response of address information of the second terminal when the server receives the connection request to the first terminal in a state where the second terminal is set as the redirect destination of the connection request to the first terminal by said setting unit, wherein when the server receives the request from the second terminal, said determination unit inquires of the first terminal whether or not to permit the second terminal to be set as the redirect destination of the connection request to the first terminal, to thereby perform the determination, and wherein at least one of the response unit, the determination unit, the setting unit, and the control unit is implemented by a processor and a memory.

4. The communication system according to claim 3, wherein the first terminal includes a storage unit configured to store a information indicative of the terminal which can be set as the redirect destination of the connection request to the first terminal, and wherein in response to inquiry from the server, the first terminal transmits a response that the second terminal is permitted to be set as the redirect destination of the connection request to the first terminal when information indicative of the second terminal is stored in said storage unit, whereas when no information indicative of the second terminal is stored in said storage unit, the first terminal transmits a response that the second terminal is not permitted to be set as the redirect destination of the connection request to the first terminal.

5. The communication system according to claim 3, wherein the first terminal includes a display unit, and wherein in response to inquiry from the server, the first terminal displays a screen, on said display unit, for inquiring of a user whether or not to permit the second terminal to be set as the redirect destination of the connection request to the first terminal, and transmits a response to the server, according to an instruction input by the user via the displayed screen.

6. A communication system in which a plurality of terminals including at least a first terminal and a second terminal and a server are connected to each other via a communication line, for performing data communication using a predetermined communication control protocol, wherein the server comprises:

a response unit configured to transmit address information of the first terminal to an external apparatus when the server receives a connection request to the first terminal from the external apparatus;

a determination unit configured to determine whether or not to permit the second terminal to be set as a redirect destination of the connection request to the first terminal when the server received from the second terminal a request for setting the second terminal as the redirect destination;

a setting unit configured to set the second terminal as the redirect destination of the connection request to the first terminal when it is determined by said determination unit that the second terminal is permitted to be set as the redirect destination of the connection request to the first terminal; and a control unit configured to control said response unit such that said response unit transmits a response of address information of the second terminal when the server receives the connection request to the first terminal in a state where the second terminal is set as the redirect destination of the connection request to the first terminal by said setting unit, wherein said determination unit determines whether or not to permit the second terminal to be set as the redirect destination of the connection request to the first terminal, based on permission information received from the second terminal and indicating that the first terminal has permitted the second terminal to be set as the redirect destination of the connection request to the first terminal received from the second terminal, wherein at least one of the response unit, the determination unit, the setting unit, and the control unit is implemented by a processor and a memory.

7. The communication system according to claim 6, wherein the second terminal includes an acquisition unit configured to acquire the permission information indicating that the first terminal has permitted the second terminal to be set as the redirect destination of the connection request to the first terminal, from the first terminal, and wherein the second terminal transmits the permission information acquired by said acquisition unit to the server when the second terminal requests the server to set the second terminal as the redirect destination of the connection request to the first terminal.

8. A server which is connected to a plurality of terminals including at least a first terminal and a second terminal via a communication line, for performing data communication using a predetermined communication control protocol, comprising:

a response unit configured to transmit address information of the first terminal to an external apparatus when the server receives a connection request to the first terminal from the external apparatus;

a storage unit configured to store information indicative of a terminal which can be set as the redirect destination of the connection request to the first terminal;

a determination unit configured to determine whether or not to permit the second terminal to be set as a redirect destination of the connection request to the first terminal when the server received from the second terminal a request for setting the second terminal as the redirect destination;

a setting unit configured to set the second terminal as the redirect destination of the connection request to the first terminal when it is determined by said determination unit that the second terminal is permitted to be set as the redirect destination of the connection request to the first terminal; and a control unit configured to control said response unit such that said response unit transmits a response of address information of the second terminal when the server receives the connection request to the first terminal in a state where the second terminal is set as the redirect destination of the connection request to the first terminal by said setting unit, wherein said determination unit determines that the second terminal is permitted to be set as the redirect destination of the connection request to the first terminal when information indicative of the second terminal is stored in said storage unit, whereas when no information indicative of the second terminal is stored in said storage unit, said determination unit determines that the second terminal is not permitted to be set as the redirect destination of the connection request to the first terminal, and wherein at least one of the response unit, the storage unit, the determination unit, the setting unit, and the control unit is implemented by a processor and a memory.

9. A communication method for a communication system in which a plurality of terminals including at least a first terminal and a second terminal and a server are connected to each other via a communication line, for performing data communication using a predetermined communication control protocol, wherein the server:

transmits from the server a response of address information of the first terminal to an external apparatus when the server receives a connection request to the first terminal from the external apparatus;

stores information indicative of a terminal which can be set as the redirect destination of the connection request to the first terminal, in a storage unit;

determines whether or not to permit the second terminal to be set as a redirect destination of the connection request to the first terminal when the second terminal requests the server to set the second terminal as the redirect destination of the connection request to the first terminal;

sets the second terminal as the redirect destination of the connection request to the first terminal when it is determined that the second terminal is permitted to be set as the redirect destination of the connection request to the first terminal; and performs control such that a response of address information of the second terminal is transmitted when the server receives the connection request to the first terminal in a state where the second terminal is set as the redirect destination of the connection request to the first terminal by said setting, wherein it is determined that the second terminal is permitted to be set as the redirect destination of the connection request to the first terminal when information indicative of the second terminal is stored in said storage unit, whereas when no information indicative of the second terminal is stored in said storage unit, it is determined that the second terminal is not permitted to be set as the redirect destination of the connection request to the first terminal.

10. A non-transitory computer-readable storage medium storing a program for causing a computer to execute the communication method according to claim 9.

11. A server which is connected to a plurality of terminals including at least a first terminal and a second terminal via a communication line, for performing data communication using a predetermined communication control protocol, comprising:

a response unit configured to transmit address information of the first terminal to an external apparatus when the server receives a connection request to the first terminal from the external apparatus;

a determination unit configured to determine whether or not to permit the second terminal to be set as a redirect destination of the connection request to the first terminal when the server received from the second terminal a request for setting the second terminal as the redirect destination;

a setting unit configured to set the second terminal as the redirect destination of the connection request to the first terminal when it is determined by said determination unit that the second terminal is permitted to be set as the redirect destination of the connection request to the first terminal; and a control unit configured to control said response unit such that said response unit transmits a response of address information of the second terminal when the server receives the connection request to the first terminal in a state where the second terminal is set as the redirect destination of the connection request to the first terminal by said setting unit, wherein when the server receives the request from the second terminal, said determination unit inquires of the first terminal whether or not to permit the second terminal to be set as the redirect destination of the connection request to the first terminal, to thereby perform the determination, and wherein at least one of the response unit, the determination unit, the setting unit, and the control unit is implemented by a processor and a memory.

12. A communication method for a communication system in which a plurality of terminals including at least a first terminal and a second terminal and a server are connected to each other via a communication line, for performing data communication using a predetermined communication control protocol, wherein the server:

transmits from the server a response of address information of the first terminal to an external apparatus when the server receives a connection request to the first terminal from the external apparatus;

determines whether or not to permit the second terminal to be set as a redirect destination of the connection request to the first terminal when the second terminal requests the server to set the second terminal as the redirect destination of the connection request to the first terminal;

sets the second terminal as the redirect destination of the connection request to the first terminal when it is determined that the second terminal is permitted to be set as the redirect destination of the connection request to the first terminal; and performs control such that a response of address information of the second terminal is transmitted when the server receives the connection request to the first terminal in a state where the second terminal is set as the redirect destination of the connection request to the first terminal by said setting, wherein when the server receives the request from the second terminal, the server inquires of the first terminal whether or not to permit the second terminal to be set as the redirect destination of the connection request to the first terminal, to thereby perform the determination.

13. A non-transitory computer-readable storage medium storing a program for causing a computer to execute the communication method according to claim 12.

14. A server which is connected to a plurality of terminals including at least a first terminal and a second terminal via a communication line, for performing data communication using a predetermined communication control protocol, comprising:

a response unit configured to transmit address information of the first terminal to an external apparatus when the server receives a connection request to the first terminal from the external apparatus;

a determination unit configured to determine whether or not to permit the second terminal to be set as a redirect destination of the connection request to the first terminal when the server received from the second terminal a request for setting the second terminal as the redirect destination;

a setting unit configured to set the second terminal as the redirect destination of the connection request to the first terminal when it is determined by said determination unit that the second terminal is permitted to be set as the redirect destination of the connection request to the first terminal; and a control unit configured to control said response unit such that said response unit transmits a response of address information of the second terminal when the server receives the connection request to the first terminal in a state where the second terminal is set as the redirect destination of the connection request to the first terminal by said setting unit, wherein said determination unit determines whether or not to permit the second terminal to be set as the redirect destination of the connection request to the first terminal, based on permission information received from the second terminal and indicating that the first terminal has permitted the second terminal to be set as the redirect destination of the connection request to the first terminal received from the second terminal, and wherein at least one of the response unit, the determination unit, the setting unit, and the control unit is implemented by a processor and a memory.

15. A communication method for a communication system in which a plurality of terminals including at least a first terminal and a second terminal and a server are connected to each other via a communication line, for performing data communication using a predetermined communication control protocol, wherein the server:

transmits from the server a response of address information of the first terminal to an external apparatus when the server receives a connection request to the first terminal from the external apparatus;

determines whether or not to permit the second terminal to be set as a redirect destination of the connection request to the first terminal when the second terminal requests the server to set the second terminal as the redirect destination of the connection request to the first terminal;

sets the second terminal as the redirect destination of the connection request to the first terminal when it is determined that the second terminal is permitted to be set as the redirect destination of the connection request to the first terminal; and performs control such that a response of address information of the second terminal is transmitted when the server receives the connection request to the first terminal in a state where the second terminal is set as the redirect destination of the connection request to the first terminal by said setting, wherein the server determines whether or not to permit the second terminal to be set as the redirect destination of the connection request to the first terminal, based on permission information received from the second terminal and indicating that the first terminal has permitted the second terminal to be set as the redirect destination of the connection request to the first terminal received from the second terminal.

16. A non-transitory computer-readable storage medium storing a program for causing a computer to execute the communication method according to claim 15.

\* \* \* \* \*